(12) United States Patent
Komaba

(10) Patent No.: US 10,323,624 B2
(45) Date of Patent: Jun. 18, 2019

(54) SPRING-POWERED DRIVE APPARATUS AND SELF-PROPELLED CASTER

(71) Applicant: ENDO KOGYO CO., LTD., Tsubame-shi, Niigata (JP)

(72) Inventor: Tomio Komaba, Kamo (JP)

(73) Assignee: ENDO KOGYO CO., LTD., Tsubame-shi, Niigata (JP)

( * ) Notice: Subject to any disclaimer, the term of this patent is extended or adjusted under 35 U.S.C. 154(b) by 0 days.

(21) Appl. No.: 15/760,695

(22) PCT Filed: Aug. 30, 2016

(86) PCT No.: PCT/JP2016/075268
§ 371 (c)(1),
(2) Date: Mar. 16, 2018

(87) PCT Pub. No.: WO2017/047370
PCT Pub. Date: Mar. 23, 2017

(65) Prior Publication Data
US 2018/0258919 A1    Sep. 13, 2018

(30) Foreign Application Priority Data

Sep. 18, 2015  (JP) ................................. 2015-184990
Mar. 31, 2016  (JP) ................................. 2016-071354

(51) Int. Cl.
*F03G 1/00*   (2006.01)
*F03G 1/02*   (2006.01)
(Continued)

(52) U.S. Cl.
CPC ................ *F03G 1/02* (2013.01); *B60B 33/00* (2013.01); *B60B 33/045* (2013.01);
(Continued)

(58) Field of Classification Search
CPC .. F03G 1/02; F03G 1/08; A63H 29/04; B60B 33/00; B60B 33/045; B60B 33/39;
(Continued)

(56) References Cited

U.S. PATENT DOCUMENTS 3,283,855 A * 11/1966 Kaplan ..................... F03G 1/02
  185/39
3,294,298 A * 12/1966 Danielson ................. A45F 5/00
  224/666
2003/0033713 A1 * 2/2003 Hausladen ....... G06K 19/07749
  29/873

FOREIGN PATENT DOCUMENTS

JP    H09-182878 A    7/1997

OTHER PUBLICATIONS

International Search Report from International Patent Application No. PCT/JP2016/075268, dated Nov. 22, 2016.

* cited by examiner

*Primary Examiner* — Phillip A Johnson
(74) *Attorney, Agent, or Firm* — Shapiro, Gabor and Rosenberger, PLLC

(57) ABSTRACT

There is provided a spring-powered drive apparatus including a casing (102), an output shaft (103) mounted on the casing (102) in a relatively rotatable manner, a one way clutch (112) externally fitted on the output shaft (103) in the casing (102) and, a spiral spring (105, 107) housed in the casing and wound by turning of the output shaft (103) in the direction in which the one way clutch (112) transmits torque. Thus, there can be provided a compact spring-powered drive apparatus and a self-propelled caster that can be applied to a work cart or the like.

33 Claims, 23 Drawing Sheets

(51) Int. Cl.
  *B60B 33/00* (2006.01)
  *F03G 1/08* (2006.01)
  *F16D 41/06* (2006.01)
  *B60B 33/04* (2006.01)
  *B62B 5/00* (2006.01)

(52) U.S. Cl.
  CPC .............. *B62B 5/0026* (2013.01); *F03G 1/08* (2013.01); *F16D 41/06* (2013.01); *B60B 33/0063* (2013.01); *B60B 2200/43* (2013.01); *B60B 2380/16* (2013.01); *B62B 2301/25* (2013.01)

(58) Field of Classification Search
  CPC ....... B60B 33/49; B62B 5/0026; F16D 41/02; F16D 41/06; F16D 41/064; F16D 2041/0608; F16D 2041/0646
  See application file for complete search history.

SPRING-POWERED DRIVE APPARATUS AND SELF-PROPELLED CASTER

TECHNICAL FIELD

The present invention relates to a spring-powered drive apparatus that can be used as a drive source for work carts, belt conveyors or the like used mainly in factories and to a self-propelled caster.

BACKGROUND ART

Hand-wound spring-powered drive units are known as spring-powered drive apparatuses used in toys such as walking dolls as disclosed in, for example, Patent Literature 1.

CITATION LIST

Patent Literature

Patent Literature 1: Japanese Patent Application Laid-Open No. H9-182878

SUMMARY OF INVENTION

Technical Problem

If a hand-wound spring-powered drive unit like that disclosed in Patent Literature 1 is designed to produce power strong enough to drive a work cart, belt conveyor, or the like, it will be necessitated to be bulky, leading to poor usability.

The present invention has been made in view of the above problem, and its object is to provide a compact spring-powered drive apparatus and a self-propelled caster.

Solution to Problem

To solve the above problems, according to the present invention, there is provided a spring-powered drive apparatus characterized by comprising:

a casing:

an output shaft partly housed in said casing, mounted on said casing in a relatively rotatable manner, and having a driving portion extending outside said casing;

a one way clutch externally fitted on said output shaft in said casing; and a spiral spring housed in said casing, having a radially inner end fixed to an outer ring of said one way clutch, and wound by turning of said output shaft in the direction in which said one way clutch transmits torque.

To solve the above problems, according to the present invention, there is also provided a spring-powered drive apparatus characterized by comprising:

a one way clutch into which an output shaft is inserted;

a cylindrical bush externally fitted on said one way clutch;

a spiral spring having a radially inner end fixed to said bush and wound by turning of said output shaft in a direction in which said one way clutch transmits torque; and a casing housing said one way clutch, said bush, and said spiral spring and having a positioner that surrounds an axial end of said bush from radially outside.

Preferably, said casing has a circumferential wall provided with a plurality of recesses on its radially inner portion opposed to the outer circumferential surface of said spiral spring, said spiral spring has a radially outer end provided with a projection that projects radially outward to be received in one of said plurality of recesses, when said spiral spring is wound, said projection is received in said recess until said spiral spring is wound to a specific degree of winding, and when said output shaft is turned beyond said specific degree of winding, said projection is dislocated from said recess.

Preferably, said projection forms a contact surface to be in contact with said recess, said contact surface extending in a substantially radial direction of said spiral spring.

Preferably, said recess is sized in such a way that said projection is dislocated from said recess after said spiral spring is wound to the maximum number of turns of said spiral spring.

Preferably, said projection is shaped in such a way that said projection is dislocated from said recess after said spiral spring is wound to the maximum number of turns of said spiral spring.

Preferably, said casing has a T-slot provided on its outer portion.

Preferably, said casing has an opening that enables the interior of said casing to be observed.

To solve the above problems, according to the present invention, there is provided a spring-powered drive apparatus characterized by comprising:

a casing;

a rotary shaft partly housed in said casing and mounted on said casing in a relatively rotatable manner, a one way clutch externally fitted on said rotary shaft in said casing;

a spiral spring housed in said casing, having a radially inner end fixed to an outer ring of said one way clutch, and wound by turning of said rotary shaft in a direction in which said one way clutch transmits torque;

a support part fixed to said casing;

an output shaft for driving a driven member, mounted on said support part in an orientation substantially parallel to said rotary shaft in a relatively rotatable manner; and a torque transmission mechanism that transmits torque of said rotary shaft to said output shaft.

Preferably, said output shaft is a hollow shaft.

Preferably, the spring-powered drive apparatus further comprises a flange member that rises from said support part, has a cylindrical shape coaxial with said output shaft, and is provided with a flange that extends radially outward.

Preferably, said casing has a circumferential wall provided with a plurality of recesses on its radially inner portion opposed to the outer circumferential surface of said spiral spring, said spiral spring has a radially outer end provided with a projection that projects radially outward to be received in one of said plurality of recesses, when said spiral spring is wound, said projection is received in said recess until said spiral spring is wound to a specific degree of winding, and when said rotary shaft is turned beyond said specific degree of winding, said projection is dislocated from said recess.

Preferably, said projection forms a contact surface to be in contact with said recess, said contact surface extending in a substantially radial direction of said spiral spring.

Preferably, said recess is sized in such a way that said projection is dislocated from said recess after said spiral spring is wound to the maximum number of turns of said spiral spring.

Preferably, said projection is shaped in such a way that said projection is dislocated from said recess after said spiral spring is wound to the maximum number of turns of said spiral spring.

Preferably, said casing has a T-slot provided on its outer portion.

Preferably, said casing has an opening that enables the interior of said casing to be observed.

To solve the above problems, according to the present invention, there is provided a self-propelled caster characterized by comprising:

a casing having a cylindrical outer circumferential surface;

a tire fixedly attached to the radially outer portion of said casing:

a center axle partly housed in said casing, mounted on said casing in a relatively rotatable manner, and partly extending outside said casing;

a one way clutch externally fitted on said center axle in said casing;

a spiral spring housed in said casing, having a radially inner end fixed to an outer ring of said one way clutch, and wound when turning relative to said center axle in the direction in which said one way clutch transmits torque.

Preferably, said casing has a circumferential wall provided with a plurality of recesses on its radially inner portion opposed to the outer circumferential surface of said spiral spring, said spiral spring has a radially outer end provided with a projection that projects radially outward to be received in said recess, when said spiral spring is wound, said projection is received in said recess until said spiral spring is wound to a specific degree of winding, and when said casing is turned beyond said specific degree of winding, said projection is dislocated from said recess.

Preferably, said projection forms a contact surface to be in contact with said recess, said contact surface extending in a substantially radial direction of said spiral spring.

Preferably, said recess is sized in such a way that said projection is dislocated from said recess after said spiral spring is wound to the maximum number of turns of said spiral spring.

Preferably, said projection is shaped in such a way that said projection is dislocated from said recess after said spiral spring is wound to the maximum number of turns of said spiral spring.

Preferably, the self-propelled caster further comprises a mount base to be attached to a target object, and a fork extending from said mount base toward said center axle to fix said mount base and said center axle.

Preferably, the self-propelled caster further comprises:

a shock absorber including a second casing, a rotary shaft partly housed in said second casing, mounted on said second casing in a relatively rotatable manner, and having a driving portion extending outside said second casing, and a second spiral spring housed in said second casing and biasing said rotary shaft; and a link shaft having one end to which said center axle is fixed in a direction substantially perpendicular to the longitudinal direction and the other end to which said rotary shaft is fixed in a direction substantially perpendicular to the longitudinal direction.

Preferably, said second casing has a T-slot provided on its outer portion.

Preferably, said casing has an opening that enables the interior of said casing to be observed.

Preferably, said second casing has an opening that enables the interior of said second casing to be observed.

Advantageous Effects of the Invention

According to the present invention, there can be provided a compact spring-powered drive apparatus and a self-propelled caster.

DESCRIPTION OF EMBODIMENTS

In the following, embodiments of the present invention will be described with reference to the drawings.

First Embodiment

Figure 1:
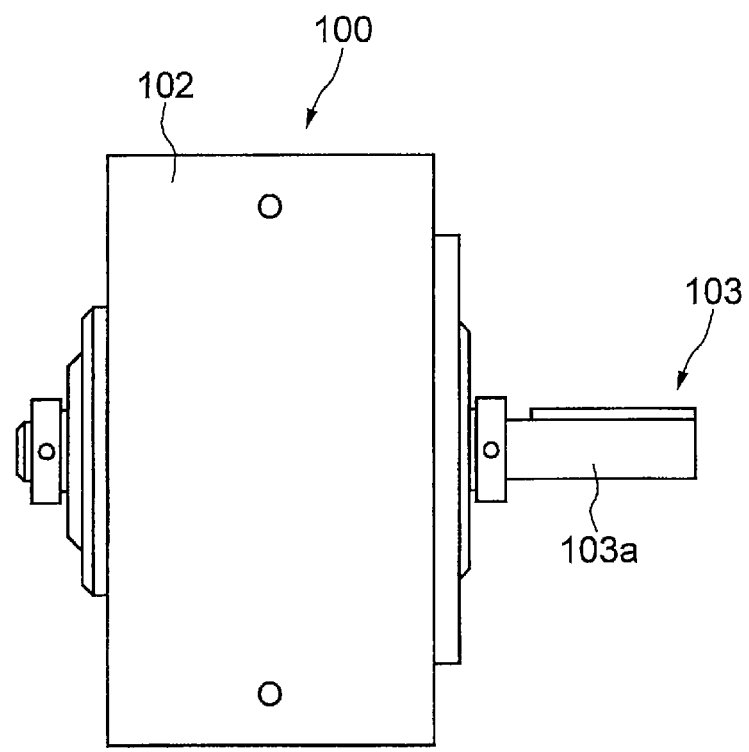
FIG. 1 is side view of a spring-powered drive apparatus according to a first embodiment of the present invention.

FIG. 1 is a side view of a spring-powered drive apparatus 100 according to a first embodiment of the present invention.

Figure 4:
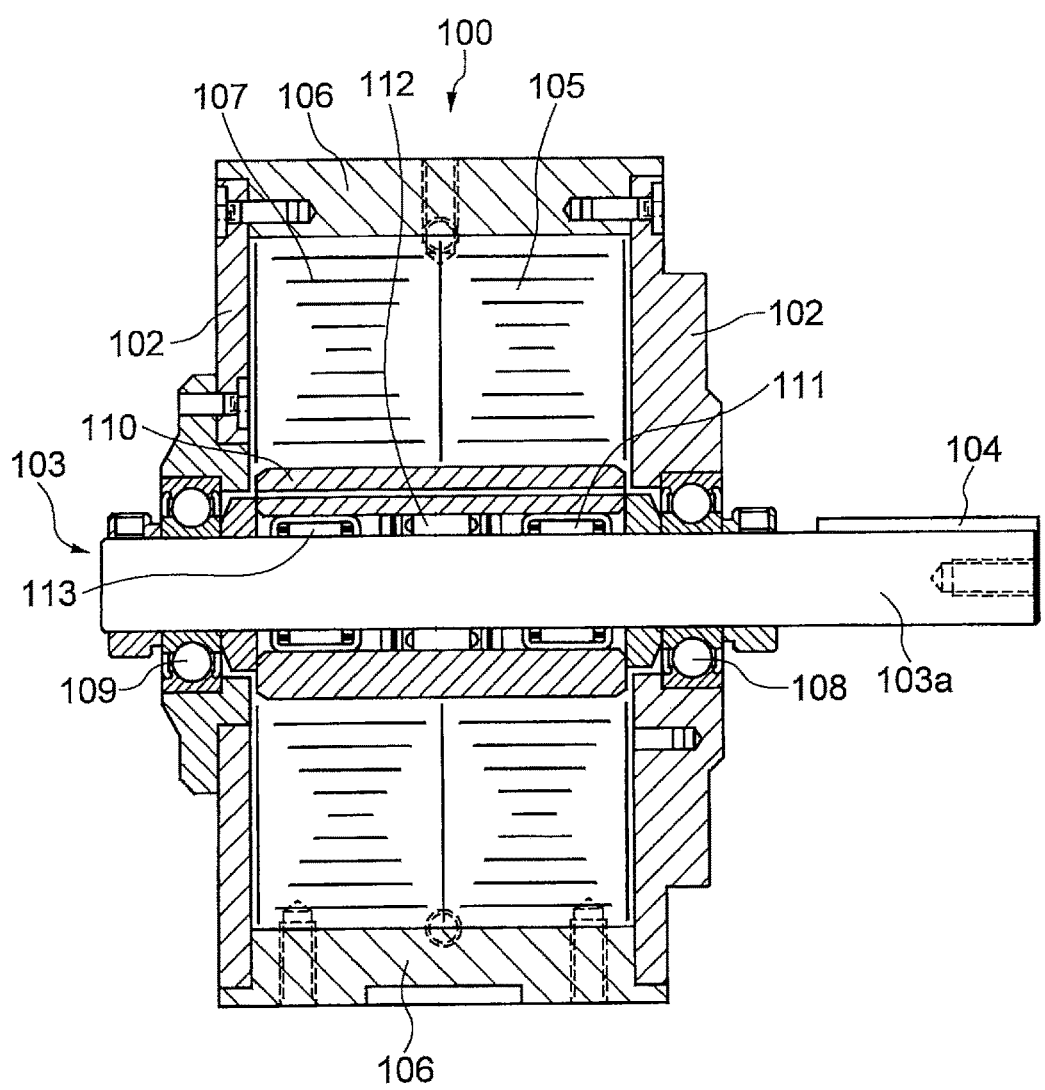
FIG. 4 is a cross sectional view of the spring-powered drive apparatus according to the first embodiment of the present invention taken on line IV-IV in FIG. 2.

The spring-powered drive apparatus 100 includes a box-like casing 107 in which spiral springs 105, 107 shown in FIG. 4 are housed and an output shaft 103 that passes through substantially the center of the casing 102 and is mounted in such a way as to be rotatable relative to the casing 102.

Figure 2:
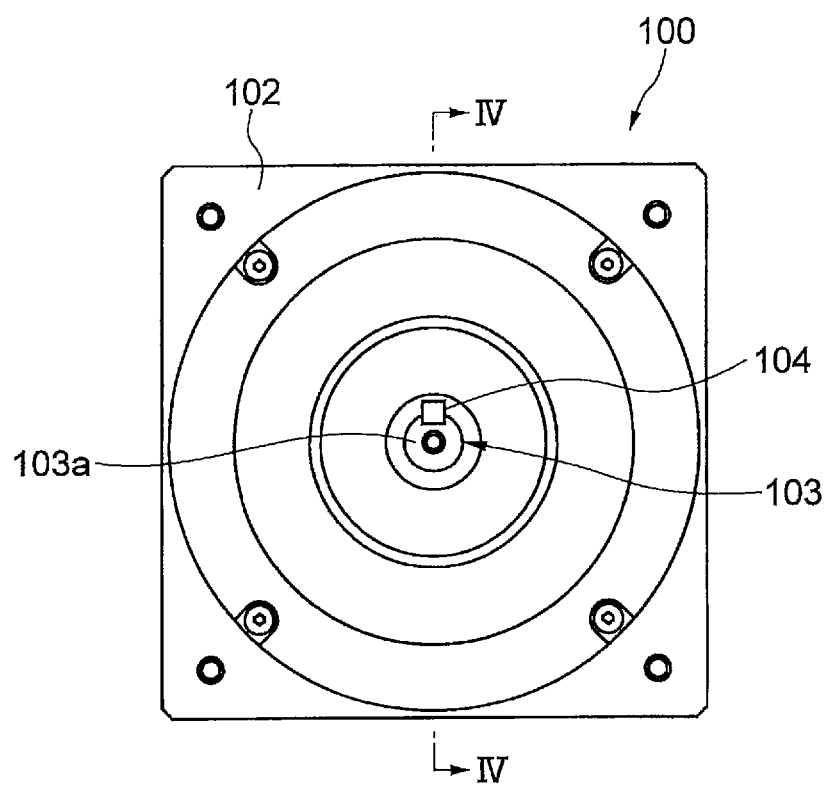
FIG. 2 is a front view of the spring-powered drive apparatus according to the first embodiment of the present invention.

FIG. 2 is a front view of the spring-powered drive apparatus 100 according to the first embodiment of the present invention. For the sake of description, the right side of the spring-powered drive apparatus 100 in FIG. 1 will be referred to as the front.

The output shaft 103 is used to wind the spiral springs 105, 107 housed in the casing 102 by turning it by external force and to output torque as driving force by the elastic restoring force of the spiral springs 105, 107. As shown in FIG. 1, the output shaft 103 has a driving part 103a sticking out from the front side of the casing 102. The driving part 103a has a key slot that extends from its axial end along the axial direction. A key 104 is fitted in the key slot. The key 104 is used to transmit torque to a driven member to be driven by the output shaft 103.

Figure 3:
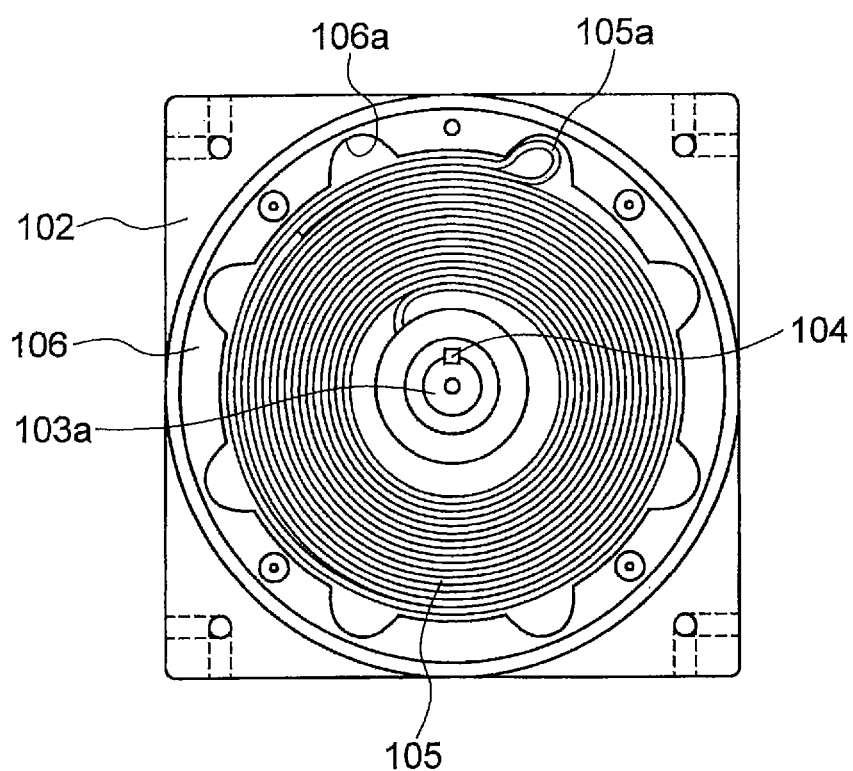
FIG. 3 is a front view of the spring-powered drive apparatus according to the first embodiment of the present invention with the front part of the casing removed.

FIG. 3 is a front view of the spring-powered drive apparatus 100 according to the first embodiment of the present invention with the front part of the casing 102 removed.

The casing 102 houses a first spiral spring 105 set around the output shaft 103. The casing 102 has a circumferential wall 106 that is arranged radially outside the first spiral spring 105 to surround it.

The radially outer end of the first spiral spring 105 is folded inward to form a projection 105a that is bent and projecting radially outward. The radially inner surface of the circumferential wall 106 is recessed to form eight recesses 106a that are recessed radially outward and arranged at regular intervals along the circumference. The radially outer portion of the projection 105a is received in and engages with one of the recesses 106a. The projection 105a may be formed by deforming the end of the first spiral spring 105, as described above. Alternatively, the projection 105a may be a separate component attached to the first spiral spring 105.

FIG. 4 is a cross sectional view of the spring-powered drive apparatus 100 according to the first embodiment of the present invention taken on line IV-IV in FIG. 2.

The casing 102 houses the first spiral spring 105 arranged on the front side and a second spiral spring 107 arranged on the back side (or the left side in FIG. 4) of the first spiral spring 105. The second spiral spring 107 is oriented in the same direction as the first spiral spring 105. The second spiral spring 107 is also provided with a projection (not shown) at its radially outer end as with the first spiral spring 105. The projection is received in and engages with the recess 106a provided on the circumferential wall 106. The radially inner ends of the first spiral spring 105 and the second spiral spring 107 are fixed to a cylindrical bush 110 inside which the output shaft 103 passes. There may be provided a thin-plate spacer between the first spiral spring 105 and the second spiral spring 107 to prevent them from interfering with each other. Moreover, there may be provided a connection pin that passes through the projection 105a of the first spiral spring 105 and the projection (not shown) of the second spiral spring 107 to connect both the projections.

A first needle bearing 111, a one way clutch 112, and a second needle bearing 113 are provided between the bush 110 and the output shaft 103. The first needle bearing 111, the one way clutch 112, and the second needle bearing 113 are arranged in the mentioned order from the front side along the axial direction of the output shaft 103. The outer ring of the one way clutch 112 is fitted inside the bush 110. The one way clutch 112 is arranged in such a way as to transmit torque to the bush 110 when the output shaft 103 is turned in the direction for winding the first and second spiral springs 105, 107 but to turn freely without transmitting torque to the bush 110 when the output shaft 103 is turned in the reverse direction. The turning direction of the output shaft 103 in which torque is transmitted to the bush 110 by the one way clutch 112 will be referred to as the torque transmitting direction.

The output shaft 103 is mounted on a first roller bearing 108 and a second roller bearing 109, the outer rings of which are fixed to the casing 102, so that the output shaft 103 is rotatable relative to the casing 102.

In the spring-powered drive apparatus 100 according to the first embodiment having the above-described construction, energy can be temporarily stored in the first and second spiral springs 105, 107 by elastically deforming the first and second spiral springs 105, 107 by turning the output shaft 103, and the stored energy can be output as torque of the output shaft 103.

The spring-powered drive apparatus 100 according to the first embodiment has the one way clutch 112 provided between the output shaft 103 and the bush 110 fixed to the inner ends of the first and second spiral springs 105, 107. Therefore, even if the output shaft 103 is turned in the direction opposite to the direction for winding the first and second spiral springs 105, 107, the first and second spiral springs 105, 107 can be prevented from breaking. Moreover, in cases, for example, where the driven member is a wheel of a work cart or the like, the cart can run by inertia even after the energy stored in the first and second spiral springs 105, 107 is output entirely.

Even if the first and second spiral springs 105, 107 are wound excessively, the projections 105a, 107a provided at the outer ends of the first and second spiral springs 105, 107 are dislocated from the recess 106a provided on the circumferential wall 106 to prevent breakage of the first and second spiral springs 105, 107 thanks to their configuration.

Specifically, as the first and second spiral springs 105, 107 are wound, their outer diameter decreases to create a gap between the projections 105a, 107a and the portions of the first and second spiral springs 105, 107 radially inside the projections 105a, 107a. When the first and second spiral springs 105, 107 are wound to a specific number of turns or a specific degree of winding and the projection 105 is pulled by a specific strength of force, the projection 105a slides on the slope of the recess 106a to shift radially inward. In consequence, the projection 105a is disengaged from the recess 106a to remove the fixation of the first and second spiral springs 105, 107 with respect to the rotational direction. Then, the projection 105a shifts in the circumferential direction due to the force exerted by the spiral springs 105, 107 and fits into the circumferentially adjacent recess 106a to engage with it. Thus, the turning of the first and second spiral springs 105, 107 is prevented again. If the output shaft 103 is turned further in the winding direction, the same motion occurs repeatedly.

It is preferred that the projection 105a and the recess 106a be configured in such a way that the projection 105a is disengaged from the recess 106a after the first and second spiral springs 105, 107 are wound to the maximum number of turns, before the first or second spiral spring 105, 107 breaks. Such configuration can be achieved, for example, by adjusting the size of the recess 106a and/or the angle of the contact surface of the projection 105a with the recess 106a. For example, to make the disengagement of the projection 105a from the recess 106a less apt to occur, the recess 106a may be enlarged. Alternatively, the contact surface of the projection 105a with the recess 106a may be configured to extend in a substantially radial direction of the first and second spiral springs 105, 107. As the projection 105a is configured to disengage from the recess 106a after the first and second spiral springs 105, 107 are wound to the maximum number of turns, the spring-powered drive apparatus 100 can provide high power while being compact.

As above, a compact spring-powered drive apparatus can be provided according to the first embodiment. In order to make the spring-powered drive apparatus 100 more compact, the number of spiral springs may be reduced to one, and the size of the casing 102 may be reduced.

Second Embodiment

A second embodiment of the present invention will be described. The spring-powered drive apparatus according to the second embodiment is the same as that according to the first embodiment except for the shape of the output shaft. Therefore, parts equivalent to those in the spring-powered drive apparatus 100 according to the first embodiment will be denoted by reference numerals equal to the reference numerals used in the description of the first embodiment plus 100 to eliminate the need for redundant descriptions. For example, the part equivalent to the output shaft 103 in the first embodiment will be denoted by numeral "203".

Figure 5:
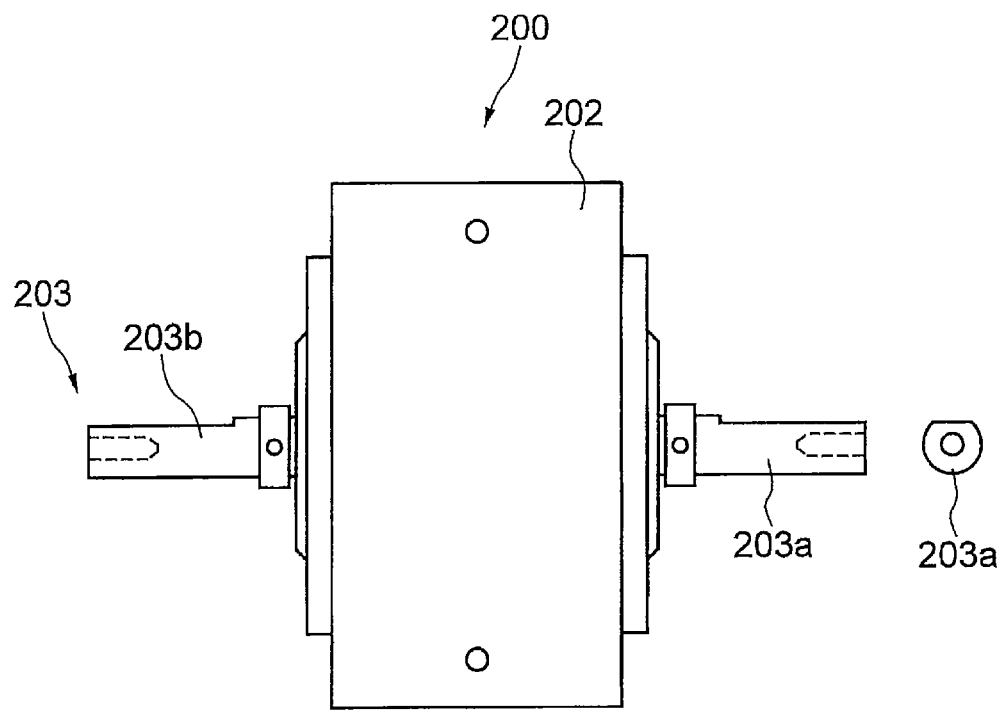
FIG. 5 is a side view of a spring-powered drive apparatus according to a second embodiment of the present invention.

FIG. 5 is a side view of a spring-powered drive apparatus 200 according to the second embodiment.

As shown in FIG. 5, the spring-powered drive apparatus 200 according to the second embodiment differs from the spring-powered drive apparatus 100 according to the first embodiment in that it has an output shaft 203 that extends out of the casing 202 on both the front and rear sides by substantially the same length. This structure according to the second embodiment allows the apparatus to output driving force on both sides of the casing 202. For example, wheels may be attached to both ends of the output shaft 203 to provide stable driving wheels for a work cart or the like.

The ends of the output shaft 203 constitute driving parts 203a, 203b for driving a driven member. As shown in the right part of FIG. 5, the driving parts 203a, 203b are cut in a D-shape, in other word, the side surface thereof is partly flat.

According to the second embodiment described above, a compact spring-powered drive apparatus 200 can be provided.

Third Embodiment

A spring-powered drive apparatus according to a third embodiment of the present invention will be described next. The spring-powered drive apparatus according to the third embodiment includes some parts that are equivalent to those in the above-described spring-powered drive apparatus according to the first embodiment. Therefore, parts in the spring-powered drive apparatus according to the third embodiment that are equivalent to those in the spring-powered drive apparatus according to the first embodiment will be denoted by reference numerals equal to the reference numerals used in the description of the first embodiment plus 200 to eliminate the need for redundant descriptions. For example, the part equivalent to the output shaft 103 in the first embodiment will be denoted by numeral "303".

Figure 6:
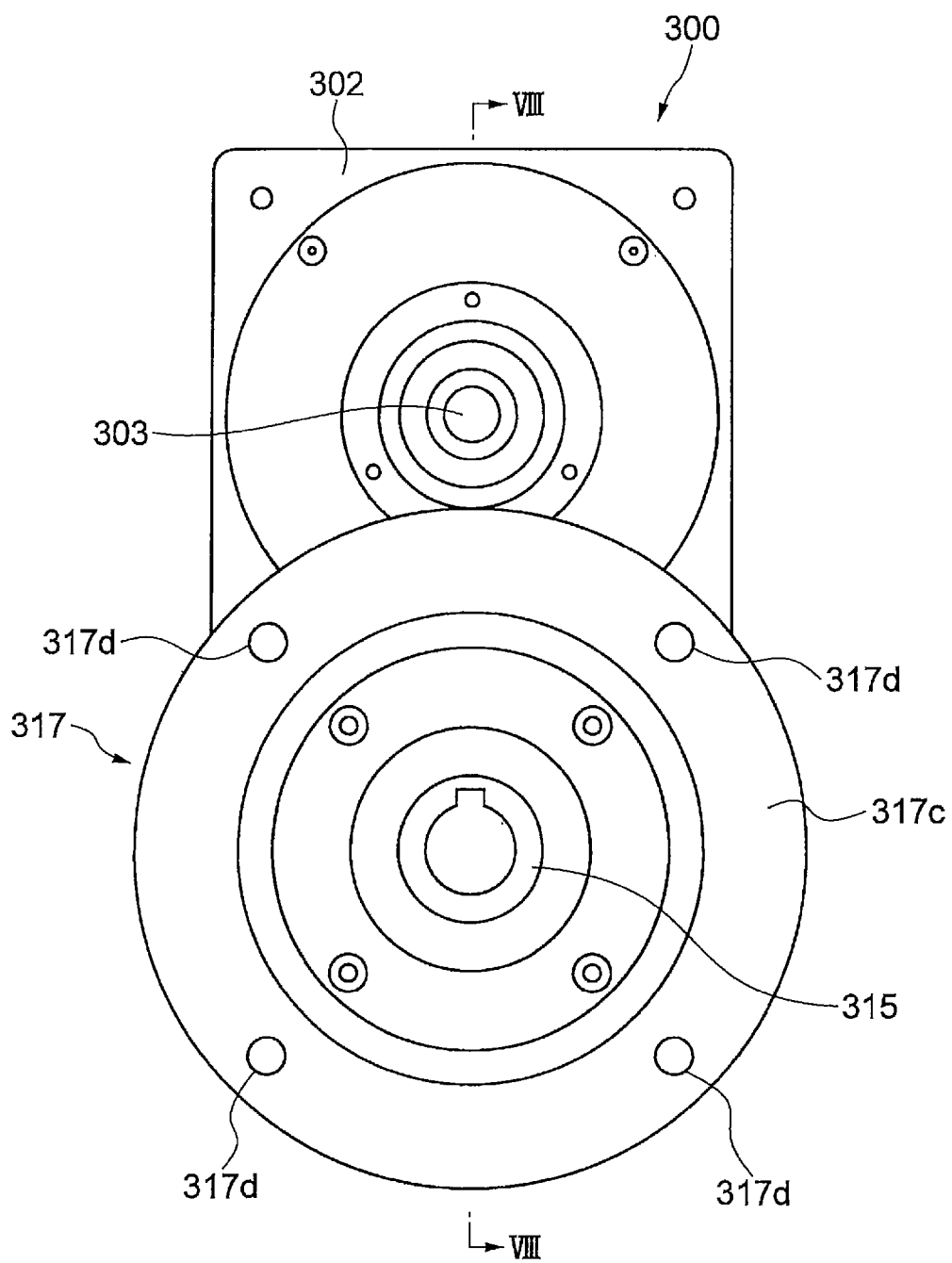
FIG. 6 is a front view of a spring-powered drive apparatus according to a third embodiment of the present invention.
Figure 7:
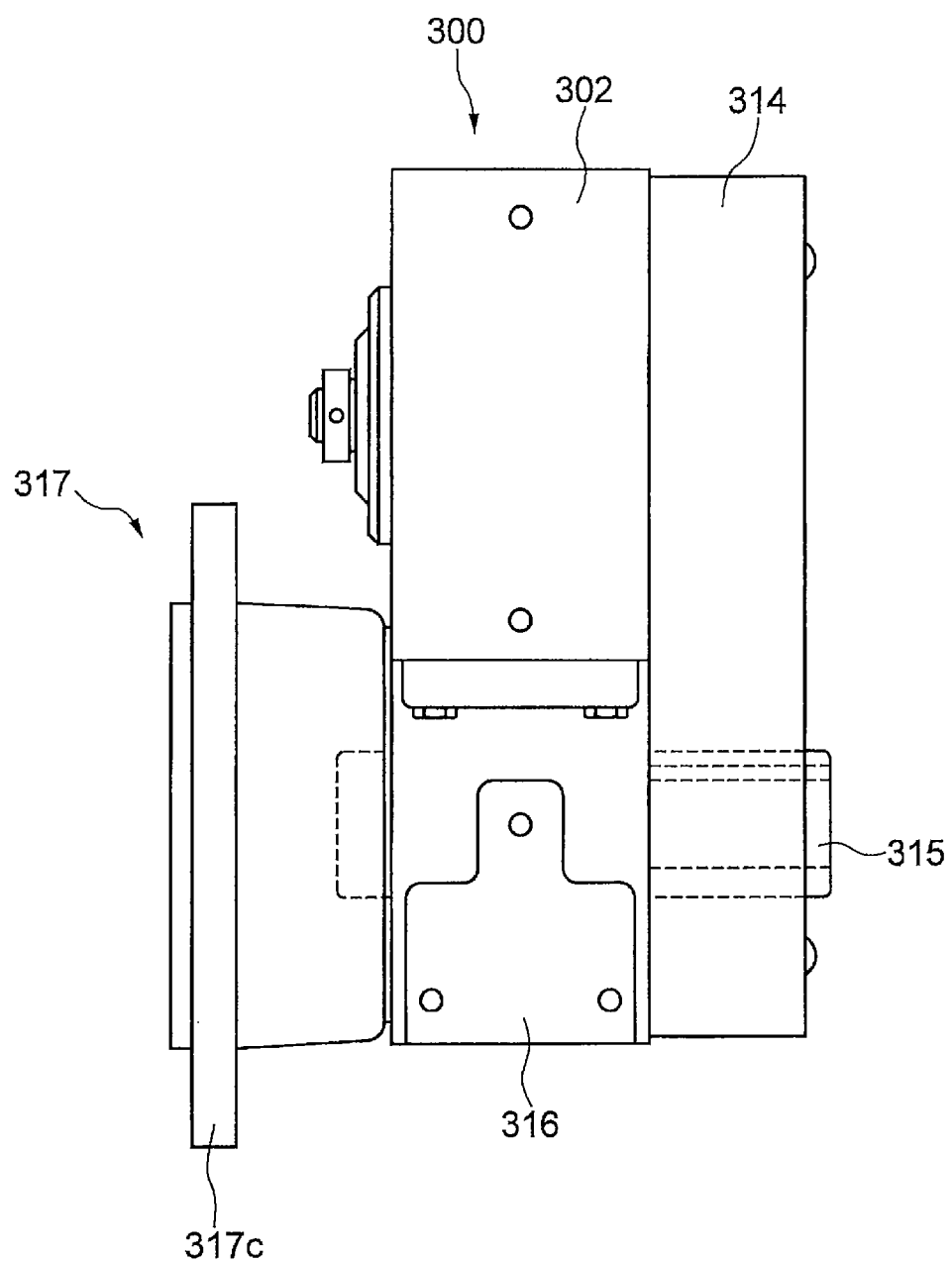
FIG. 7 is a side view of the spring-powered drive apparatus according to the third embodiment of the present invention.

FIG. 6 is a front view of a spring-powered drive apparatus 300 according to the third embodiment of the present invention. FIG. 7 is a side view of the spring-powered drive apparatus 300 according to the third embodiment of the present invention. The left side of FIG. 7 will be referred to as the front side of the spring-powered drive apparatus 300.

Figure 8:
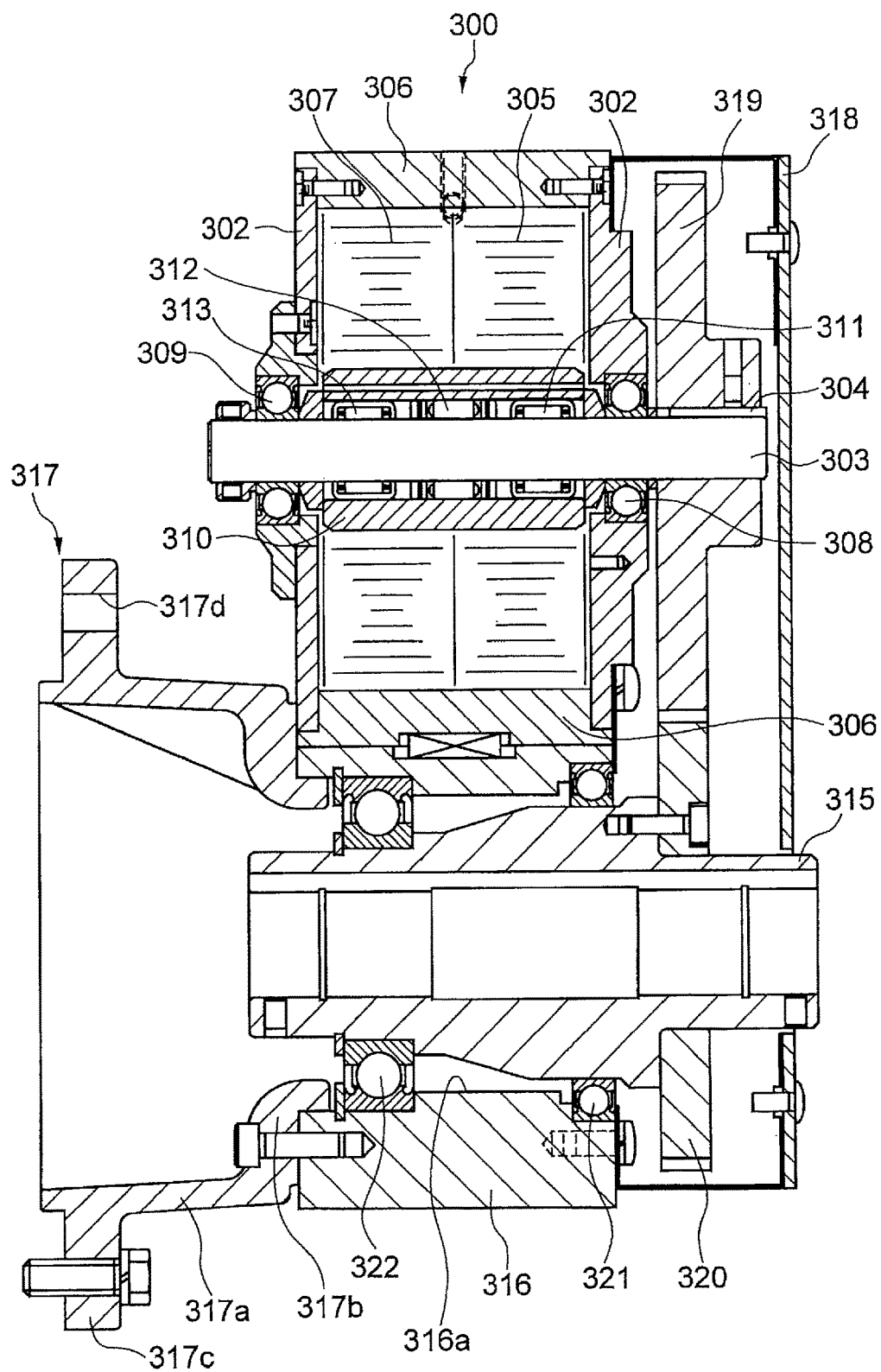
FIG. 8 is a cross sectional view of the spring-powered drive apparatus according to the third embodiment of the present invention taken on line VIII-VIII in FIG. 6.

The spring-powered drive apparatus 300 according to the third embodiment has a casing 302 through which a rotary shaft 303 passes at its substantial center as in the above-described spring-powered drive apparatus 100 according to the first embodiment and in which spiral springs 305, 307, which will be described later with reference to FIG. 8, are housed.

As shown in FIG. 7, on the rear side of the casing 302 is attached a gear case 314, in which a plurality of gears constituting a torque transmission system is housed. The output shaft 315 passes in the lower portion of the gear case 314. The torque produced by the spiral springs 305, 307 housed in the casing 302 is transmitted to the output shaft 315 by the torque transmission system housed in the gear case 314. The output shaft 315 is a hollow cylindrical shaft, in which a bar-shaped driven member is fitted in a relatively non-rotatable manner to allow torque transmission.

A support part 316 is attached to the lower portion of the casing 302. The support part 315 supports the output shaft 315 in a rotatable manner. The output shaft 315 passes through the gear case 314 and the support part 316. A flange member 317 is attached to the front side of the support member 316. The flange member 317 is a cylindrical member rising from the support member 316 and provided with a flange 317c that extends radially outward. The flange member 317 is coaxial with the aforementioned output shaft 315, and the front side end of the output shaft 315 is located radially inside the flange member 317.

FIG. 8 is a cross sectional view of the spring-powered drive apparatus 300 according to the third embodiment of the present invention taken on line VIII-VIII in FIG. 6.

The structure relating to the casing 302 is the same as that in the above-described spring-powered drive apparatus 100 according to the first embodiment, as described specifically below. A solid rotary shaft 303 passing through the casing 302 is attached to the casing 302 in a relatively rotatable manner by first and second roller bearings 308, 309. The radially inner ends of spiral springs 305, 307, which are housed in the casing 302 and surrounded by a circumferential wall 306, are fixed to a cylindrical bush 310 through which the rotary shaft 303 passes. Needle bearings 311, 313 and a one way clutch 312 are provided between the bush 310 and the rotary shaft 303.

The outer diameter of the solid rotary shaft 303 is allowed to be made smaller than the outer diameter of the hollow output shaft 315. Therefore, in the above-described structure, a larger housing space for the spiral springs 305, 307 in the casing 302 can be left than in the case where the output shaft 315 is located at the center of the spiral springs 305, 307, enabling downsizing of the casing 302.

A first spur gear 319 housed in a gear case 314 is fitted on the end of the rotary shaft 303 on the rear side of the spring-powered drive apparatus 300, namely on the right side in FIG. 8. The first spur gear 319 is in engagement with a second spur gear 320 that is also housed in the gear case 314 and fitted on the output shaft 315 on the rear side of the spring-powered drive apparatus 300. Thus, in the third embodiment, the revolving speed and the torque of the output shaft 315 can be set easily by changing the gear ratio of the first and second spur gears 319, 320.

The output shaft 315 is mounted on the support part 316 in a relatively rotatable manner by third and fourth roller bearings 321, 322, of which the outer rings are fixed to the bore portion 316a of the support member 316.

As shown in FIG. 8, the flange member 317 has a cylindrical portion 317a, a reduced diameter portion 317b on the support part 316 side of the cylindrical portion 317a, and an annular flange 317c that extends radially outward from the portion of the cylindrical portion 317a facing away from the support part 316. The reduced diameter portion 317b is fixed to the bore portion 316a of the support part 316. As shown in FIG. 6, the flange 317c has four through holes 317d passing through it along the axial direction of the output shaft 315, which are arranged at substantially regular intervals.

The above-described configuration enables the spring-powered drive apparatus 300 according to the third embodiment to be mounted on a target object such as a work cart easily by the through holes 317d of the flange 317c, and the spring-powered drive apparatus 300 can drive the work cart with a driven shaft such as an axle shaft of the work cart fitted into the output shaft 315.

As the output shaft 315 is arranged side-by-side (or substantially parallel) with the rotary shaft 303 disposed inside the first and second spiral springs 305, 307, the axial dimension of the output shaft of the spring-powered drive apparatus 300 can be made small, and the space needed to provide the spring-powered drive apparatus 300 can be made smaller. Moreover, a torque arm can be attached directly to the support part 316 using a screw hole for attaching the flange member 317.

According to the above-described third embodiment, there can be provided a spring-powered drive apparatus 300 that is compact, requires a reduced mount space, and can easily be attached to a target object.

Fourth Embodiment

A spring-powered drive apparatus according to a fourth embodiment of the present invention will be described. The spring-powered drive apparatus according to the fourth embodiment is basically the same as the above-described spring-powered drive apparatus 300 according to the third embodiment except for not having the flange member 317. Therefore, parts that are equivalent to those in the spring-powered drive apparatus 300 according to the third embodiment will be denoted by reference numerals equal to the reference numerals used in the description of the third embodiment plus 100 to eliminate the need for redundant descriptions. For example, the part equivalent to the output shaft 303 in the third embodiment will be denoted by numeral "403".

Figure 9:
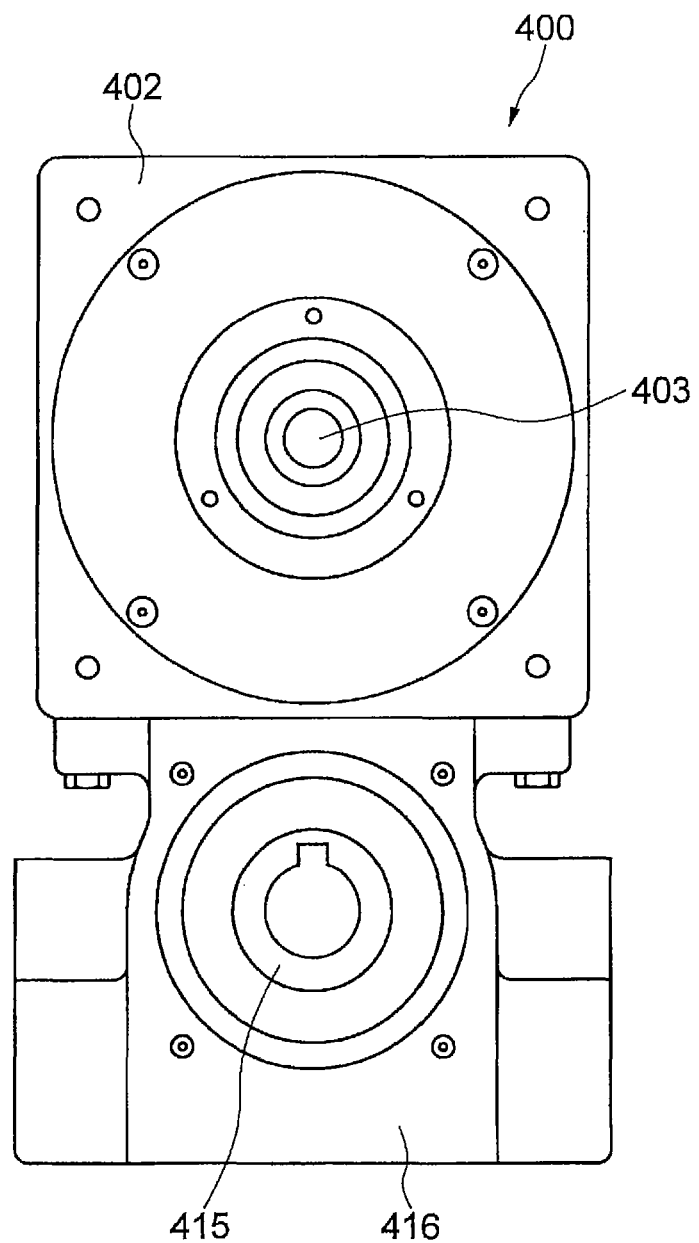
FIG. 9 is a front view of a spring-powered drive apparatus according to a fourth embodiment of the present invention.
Figure 10:
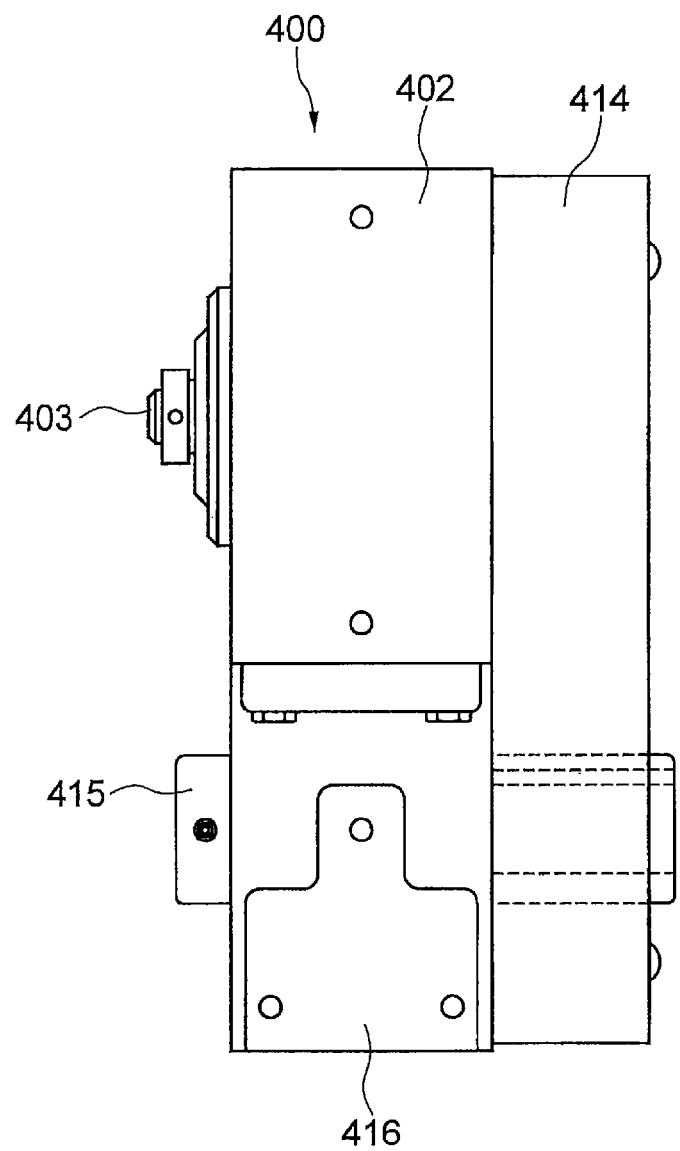
FIG. 10 is a side view of the spring-powered drive apparatus according to the fourth embodiment of the present invention.

FIG. 9 is a front view of a spring-powered drive apparatus 400 according to the fourth embodiment of the present invention. FIG. 10 is a side view of the spring-powered drive apparatus 400 according to the fourth embodiment of the present invention.

The spring-powered drive apparatus 400 has a casing 402 through which a rotary shaft 403 passes and in which spiral springs for applying force to the rotary shaft 403 are housed, a support part 416 that is attached to the casing 402 to support an output shaft 415 in a rotatable manner, and a gear case 414 in which a plurality of gears that transmit torque from the rotary shaft 403 to the output shaft 415 are housed.

In the spring-powered drive apparatus 400 having the above-described construction, energy can be stored by elastically deforming the spiral spring housed in the casing 402 by turning the output shaft 415 in the direction for winding the spiral spring, and the stored energy can be output by the output shaft 415 to drive a driven shaft of a work cart or the like.

According to the fourth embodiment described above, there can be provided a spring-powered drive apparatus 400 that is more compact than the apparatus according to the third embodiment and requires a smaller mount space.

Fifth Embodiment

A self-propelled caster according to a fifth embodiment of the present invention will be described next. The self-propelled caster according to the fifth embodiment partly has the structure same as the above-described spring-powered drive apparatuses 100, 200 according to the first and second embodiments. Therefore, parts that are equivalent to those in the spring-powered drive apparatuses 100, 200 according to the first and second embodiments will be denoted by reference numerals given by changing the hundreds digit to "5" to eliminate the need for redundant descriptions. For example, the part equivalent to the output shaft 103 in the first embodiment and the output shaft 203 in the second embodiment will be denoted by numeral "503".

Figure 11:
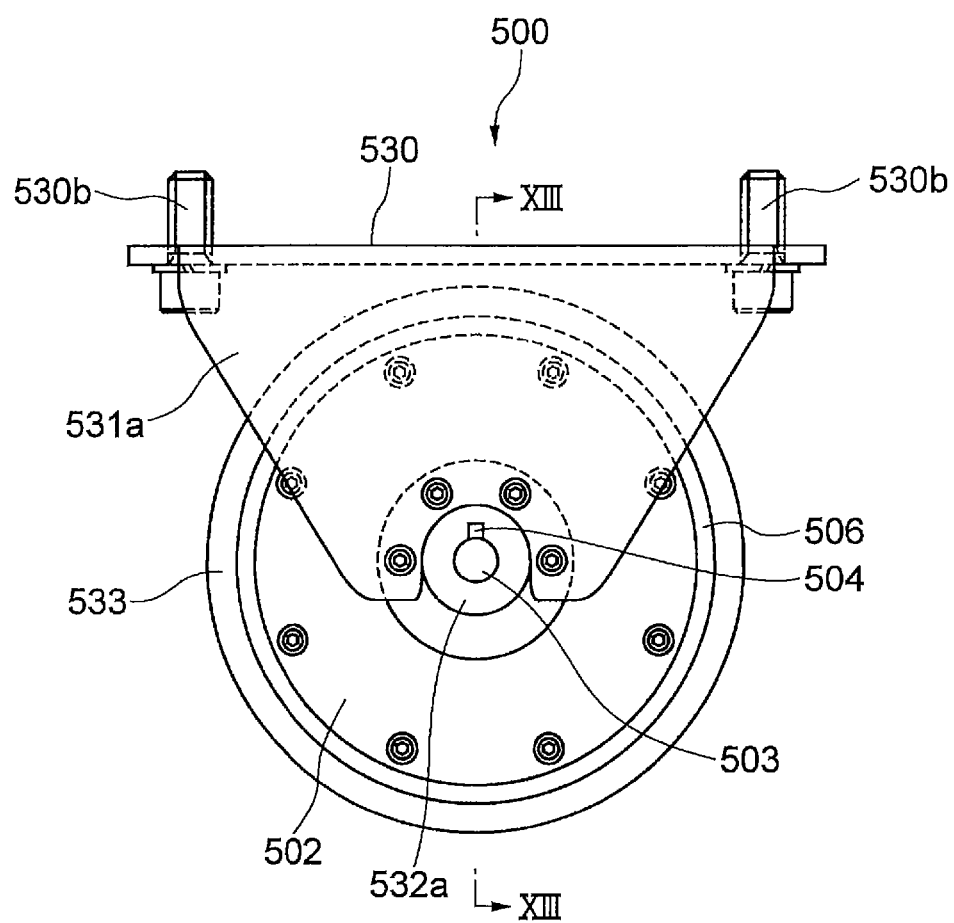
FIG. 11 is a side view of a self-propelled caster according to a fifth embodiment of the present invention.

FIG. 11 is a side view of a self-propelled caster 500 according to the fifth embodiment of the present invention.

Figure 13:
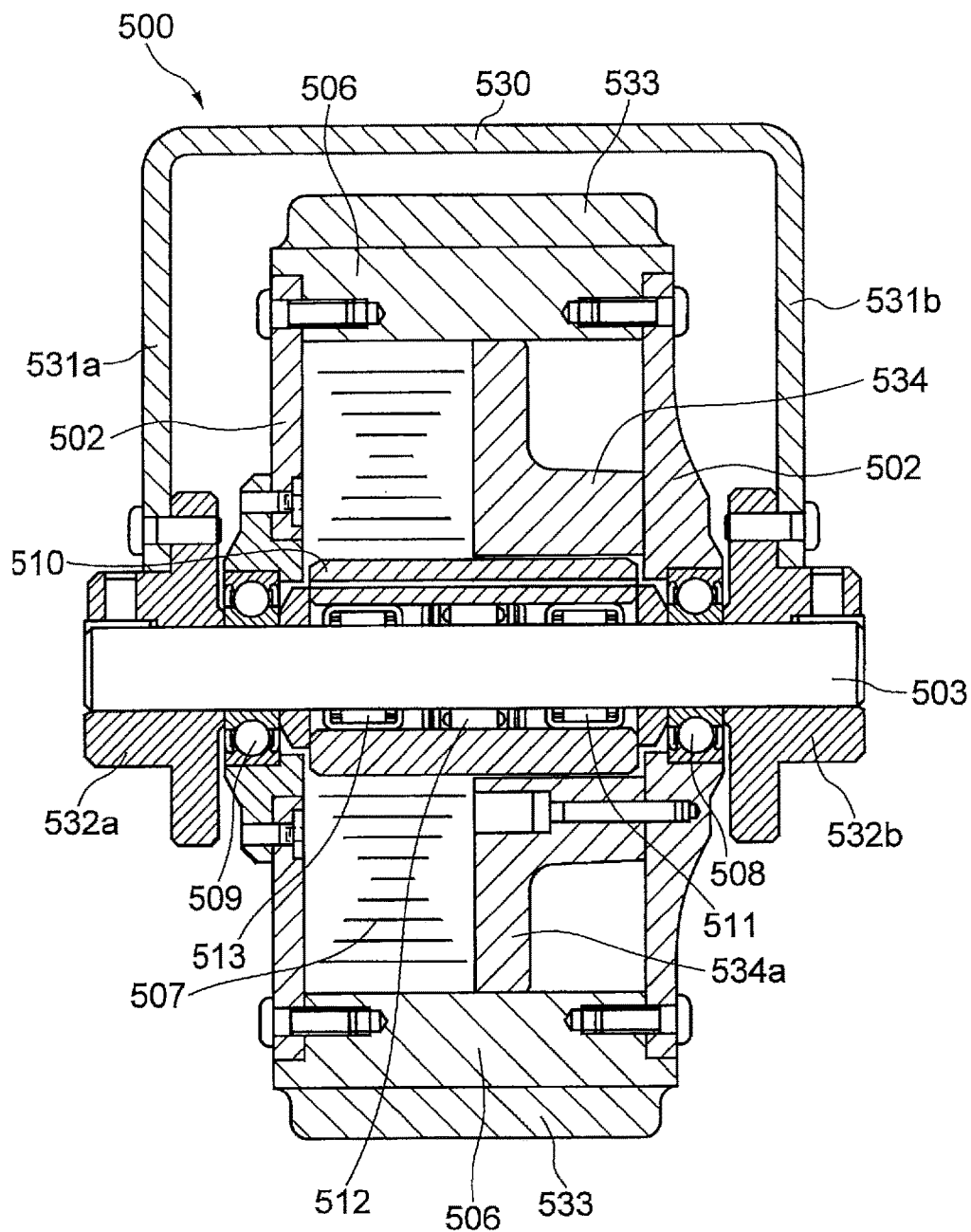
FIG. 13 is a cross sectional view of the self-propelled caster according to the fifth embodiment of the present invention taken on line XIII-XIII in FIG. 11.

The self-propelled caster 500 includes a flat shaped mount base 530 to be mounted on a target object such as a work cart, forks 531a, 531b extending downward from the mount base 530, ring members 532a fixed to the lower portion of the respective forks 531a, 531b, a center axle 503 fitted inside the ring members 532a, 532b in a relatively non-rotatable manner, a casing 502 attached to the center axle 503 by a key 504 in a relatively rotatable manner, having a cylindrical outer circumferential surface, and housing a spiral spring 507 inside it as shown in FIG. 13, and a tire 533 attached on radially outside surface of the circumferential wall 506 of the casing 502. The rear side of the self-propelled caster 500 shown in FIG. 11 has the same structure as the front side.

Figure 12:
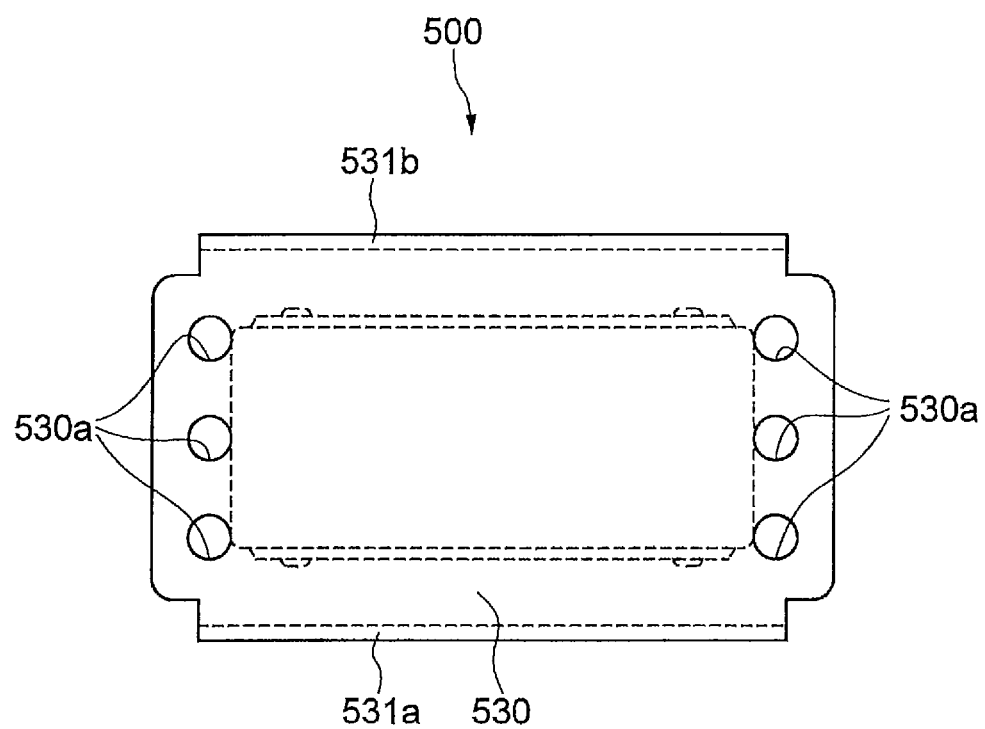
FIG. 12 is a plan view of the self-propelled caster according to the fifth embodiment of the present invention.

FIG. 12 is a plan view of the self-propelled caster 500 according to the fifth embodiment of the present invention.

The mount base 530 has a rectangular shape with the long sides parallel to the traveling direction and has three through holes 530a passing through it in the vertical direction and provided near the front and the rear end. As shown in FIG. 11, the mount base 530 is attached to a target object by screws 530b inserted through the through holes 530a. The forks 531a, 531b extend downward from the long side edges of the mount base 530.

FIG. 13 is a cross sectional view of the self-propelled caster 500 according to the fifth embodiment of the present invention taken on line XIII-XIII in FIG. 11.

In the apparatus according to the fifth embodiment, only one spiral spring 507 is housed in the casing 502, and a spacer 534 fixed to the casing 502 is housed in the remaining space in the casing 502. The spacer 534 is fixed to the casing 502 on its side opposite to the spiral spring 507 and has a flange 534a that faces the side surface of the spiral spring 507. Alternatively, a second spiral spring may be provided in the space in the casing 502 in which the spacer 534 is housed to increase the output torque as in the above described first embodiment.

The radially inner end of the spiral spring 507 is fixed to a bush 510 through which the center axle 503 passes. Between the bush 510 and the center axle 503 are provided a first needle bearing 511, a one way clutch 512, and a second needle bearing 513, which are arranged along the axis of the center axle 503. The radially outer end of the spiral spring 507 is provided with a projection like that in the first embodiment described above, and the projection is partly received in one of a plurality of recesses provided on the radially inner side of the circumferential wall 506.

The casing 502 is attached to the center axle 503 in a relatively rotatable manner by a first roller bearing 508 and a second roller bearing 509.

The one way clutch 512 is arranged in such a way as to fix the bush 510 so that the bush 510 will not rotate about the center axle 503 when the casing 502 is turned in the direction for winding the spiral spring 507 but to turn freely so that the bush 510 will rotate about the center axle 503 when the casing 502 is turned in the reverse direction.

The self-propelled caster 500 according to the fifth embodiment structured as above can be attached to a work cart or the like by the mount base 530. As the work cart to which the self-propelled caster 500 is attached as a caster is moved in the direction for winding the spiral spring 507, the spiral spring 507 deforms elastically to store energy in it. If the work cart is left in a free state thereafter, the spiral spring 507 elastically restores, so that the casing 502, the spiral spring 507, and the tire 533 turn about the center axle 503 to cause the work cart to run. This work cart can be used in an automobile production line as a cart that is drawn by the production line to transport parts or tools to a desired place and then separated from the production line to run in the direction reverse to the direction of flow of the production line back to its original position. This system does not need external supply of power such as electric power for moving the work cart. Alternatively, the self-propelled caster 500 can be used as an assist equipment for a hand truck to reduce the effort of a worker.

Even if the work cart is moved in the direction for winding the spiral spring 507 beyond the limit of winding of the spiral spring 507, breakage of the spiral spring 507 can be prevented by virtue of the structure of the projection provided at the radially outer end of the spiral spring 507 and the recesses provided on the circumferential wall 506. Even after the work cart has traveled by the elastic restoration of the spiral spring 507 and the spiral spring 507 has elastically restored completely, the work cart can run by inertia.

As described above, a compact self-propelled caster can be provided according to the fifth embodiment.

Sixth Embodiment

A self-propelled caster 800 according to a sixth embodiment of the present invention will be described next. The self-propelled caster 800 according to the sixth embodiment includes some parts that are equivalent to those in the above-described spring-powered drive apparatus 100 according to the first embodiment and the above-described self-propelled caster 500 according to the fifth embodiment. Therefore, parts that are equivalent to those in the first embodiment will be denoted by reference numerals given by changing the hundreds digit to "6", and parts that are equivalent to those in the fifth embodiment will be denoted by reference numerals given by changing the hundreds digit to "7" to eliminate the need for redundant descriptions. For example, the part equivalent to the output shaft 103 in the first embodiment will be denoted by numeral "603", and the part equivalent to the center axle 503 in the fifth embodiment will be denoted by numeral "703".

Figure 14:
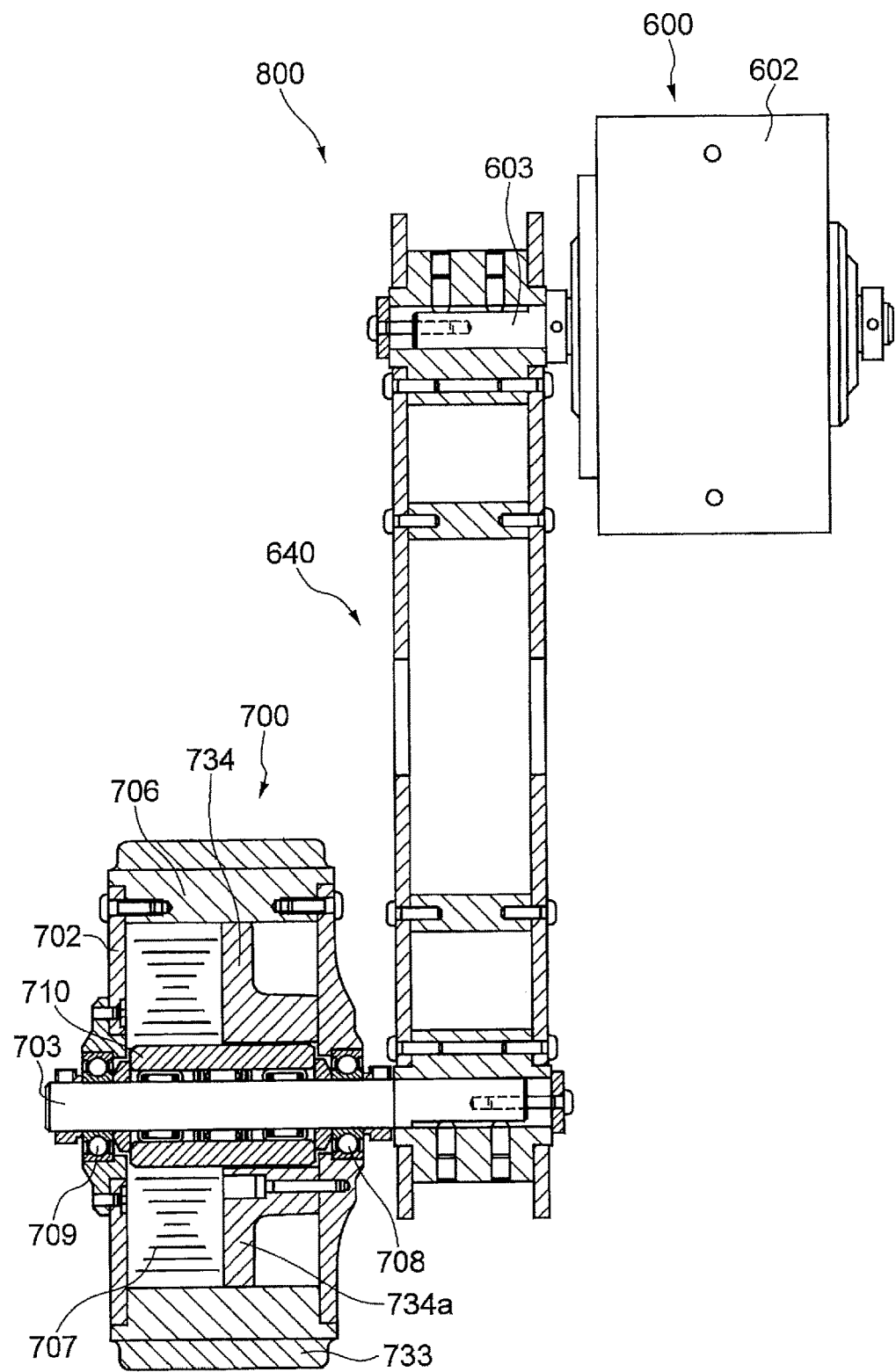
FIG. 14 is a cross sectional view of the self-propelled caster according to a sixth embodiment of the present invention.

FIG. 14 is a cross sectional view of the self-propelled caster 800 according to the sixth embodiment of the present invention, where a spring-powered drive apparatus 600 is illustrated as a plan view.

The self-propelled caster 800 according to the sixth embodiment includes a spring-powered drive apparatus 600 having the same structure as the above-described apparatus according to the first embodiment, a self-propelled wheel 700 similar to that according to the fifth embodiment but modified to have a center axle 703 extended on one side and to have no parts for mounting like the mount base 530 and the forks 531a, 531b, and a link shaft 640 that links the spring-powered drive apparatus 600 and the self-propelled wheel 700. The spring-powered drive apparatus 600 functions as a shock absorber. The link shaft 640 has an end to which the rotary shaft 603 of the spring-powered drive apparatus 600 is fixed in the direction substantially perpendicular to the longitudinal direction of the link shaft 640. The link shaft 640 has the other end to which the center axle 703 of the self-propelled wheel 700 is fixed in the direction substantially perpendicular to the longitudinal direction of the link shaft 640.

The self-propelled caster 800 is attached to a target object such as a work cart in such a way that the spring-powered drive apparatus 600 biases the self-propelled wheel 700 toward the floor via the link shaft 640. Thus, the work cart can run in the same manner as in the above-described fifth embodiment while the spring-powered drive apparatus 600 functions as a shock absorber to absorb impacts the self-propelled wheel 700 receives from the floor.

The self-propelled caster 800 according to this embodiment is particularly useful when applied to an existing work cart. In cases where the self-propelled caster 500 according to the above-described fifth embodiment is attached to an existing work cart without removing its casters, there is a possibility that the self-propelled caster 500 may be sometimes detached from the floor due to unevenness of the floor to idle when driven by the spiral spring 507. In contrast, in cases where the self-propelled caster 800 according to the sixth embodiment is used, the self-propelled wheel 700 is caused to follow the unevenness of the floor so as to be continuously in contact with the floor with pressure. Therefore, the self-propelled wheel 700 is prevented from idling due to unevenness of the floor.

The self-propelled caster 800 may be installed in such a way that the spring-powered drive apparatus 600 is fixed to the floor or the like and the self-propelled wheel 700 is in press contact with the bottom surface of a movable work table. Thus, it is possible to drive the movable work table. In this case also, even if the movable work table moves up and down, the self-propelled wheel 700 will follow the movement to keep in continuous contact with the movable work table, so that the self-propelled wheel 700 can be prevented from idling.

As above, according to the sixth embodiment, there can be provided a compact self-propelled caster with shock absorber.

Seventh Embodiment

A seventh embodiment of the present invention will be described next. A spring-powered drive apparatus according to the seventh embodiment is the same as the above-described apparatus according to the first embodiment except for several features. Therefore, parts equivalent to those in the spring-powered drive apparatus 100 according to the first embodiment will be denoted by reference numerals equal to the reference numerals used in the description of the first embodiment plus 800 to eliminate the need for redundant descriptions. For example, the part equivalent to the output shaft 103 in the first embodiment will be denoted by numeral "903".

Figure 15:
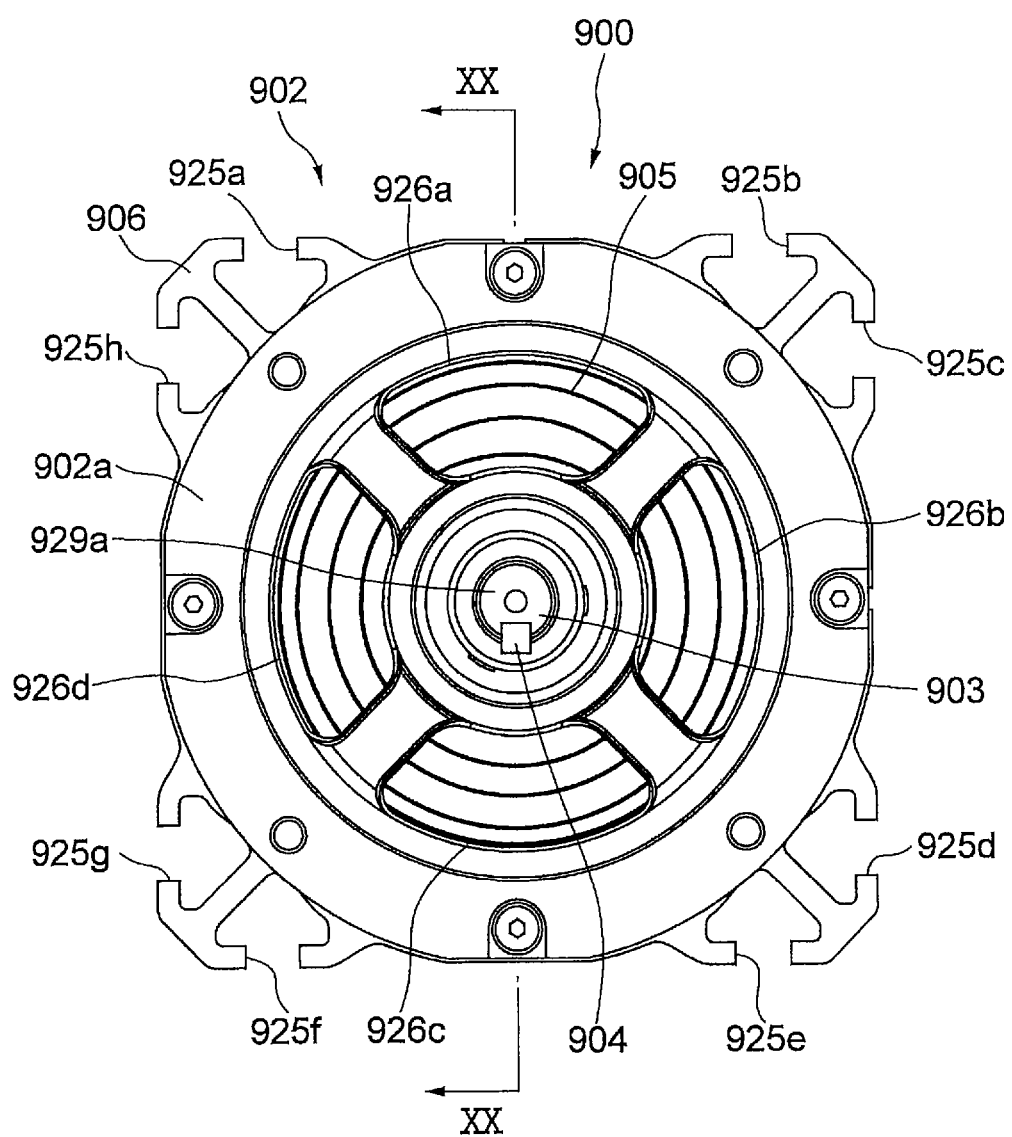
FIG. 15 is a front view of a spring powered drive apparatus according to a seventh embodiment.
Figure 16:
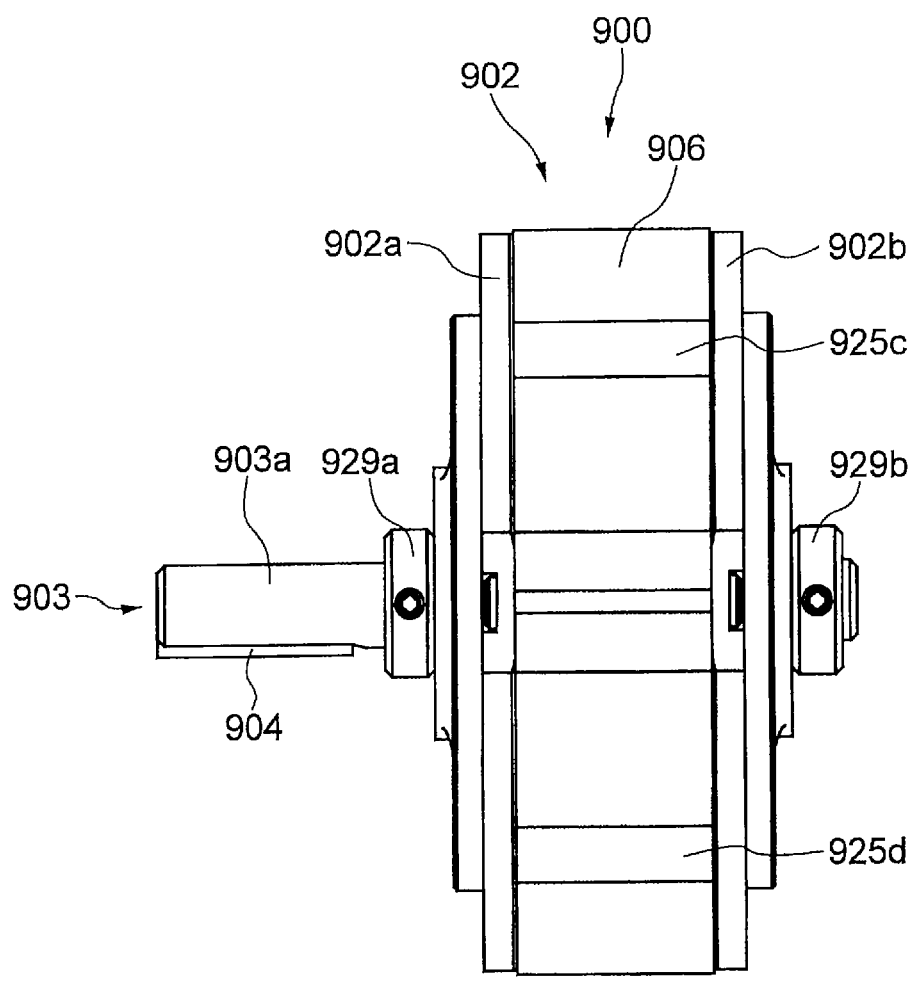
FIG. 16 is a side view of the spring-powered drive apparatus according to the seventh embodiment.
Figure 17:
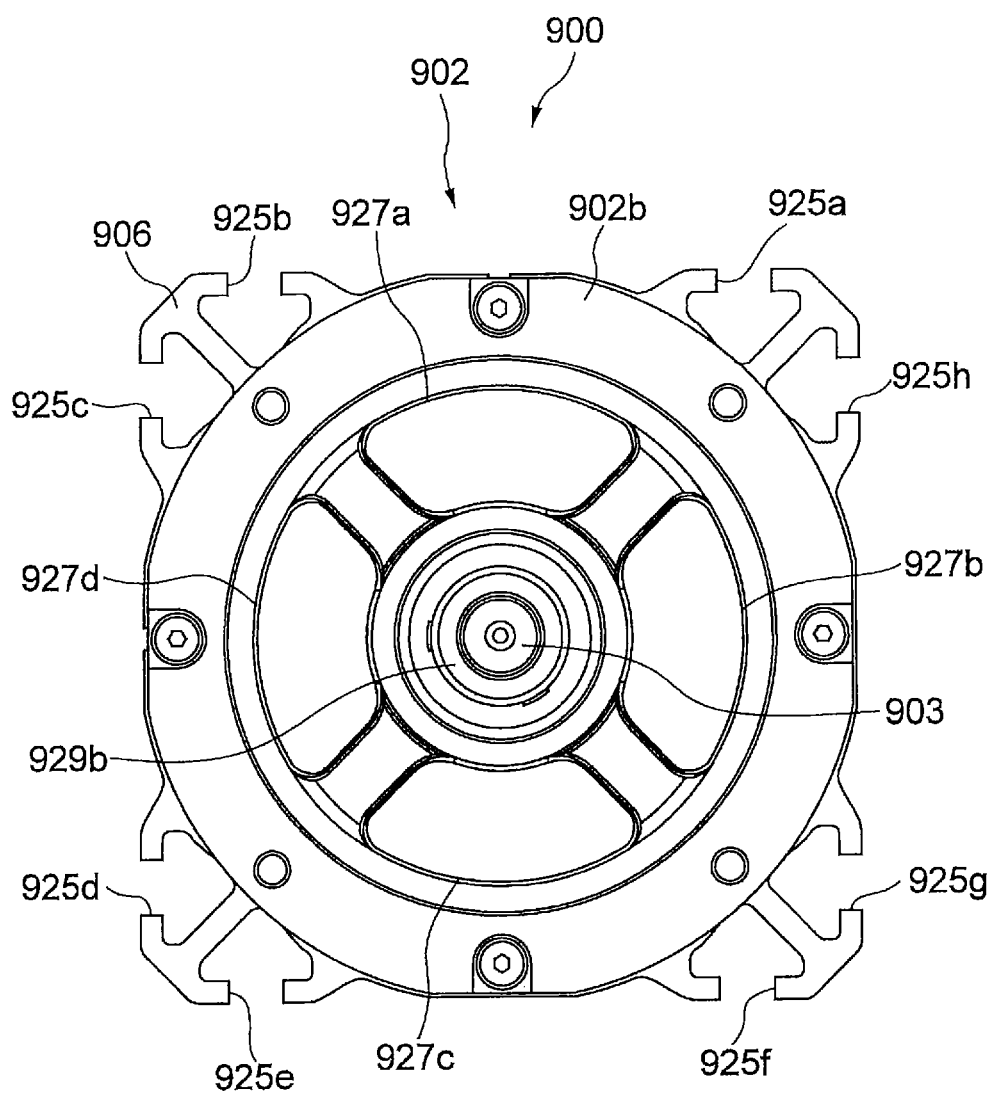
FIG. 17 is a rear view of the spring-powered drive apparatus according to the seventh embodiment.
Figure 18:
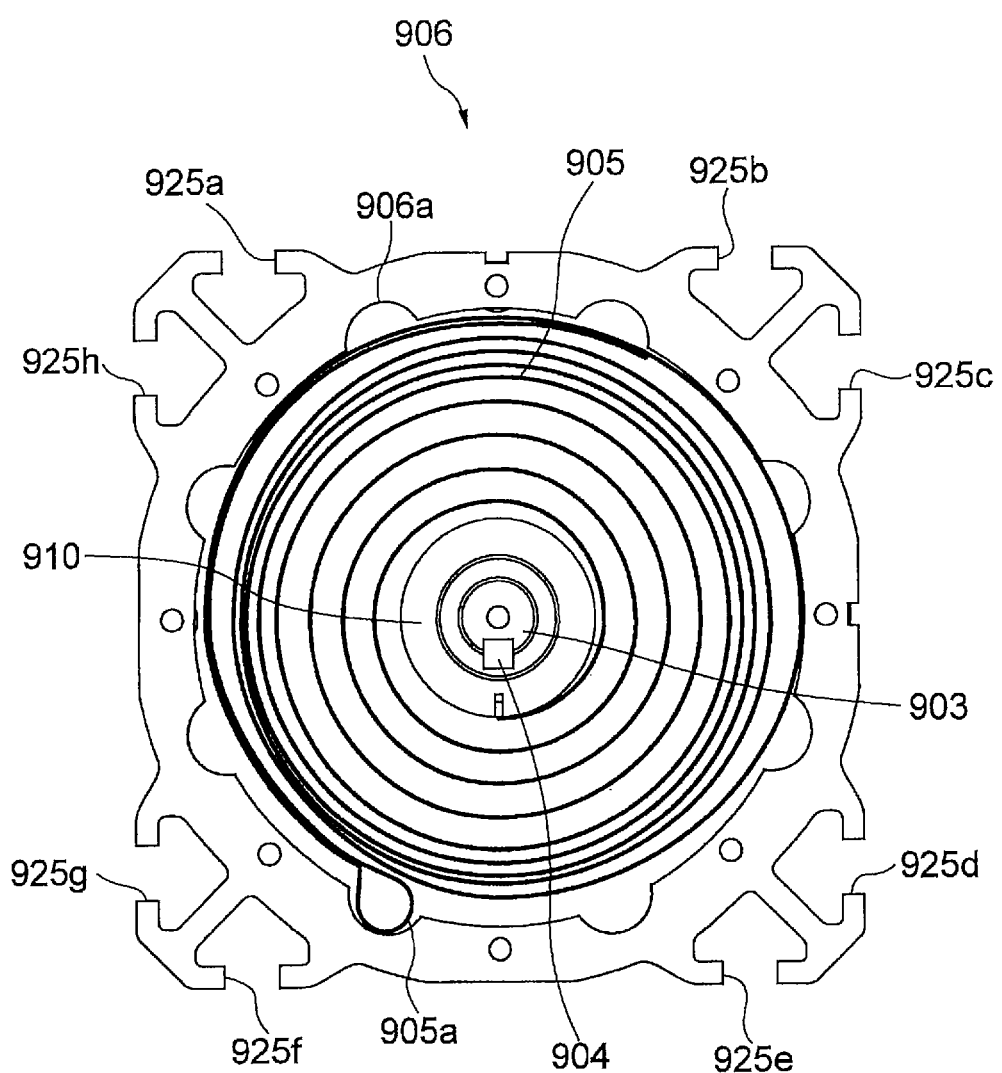
FIG. 18 is a front view of the spring powered drive apparatus according to the seventh embodiment in a state in which a front cover is removed.

Features of the spring powered drive apparatus 900 according to the seventh embodiment that are different from the spring-powered drive apparatus 100 according to the first embodiment will be described with reference to FIGS. 15 to 18. FIG. 15 is a front view of the spring-powered drive apparatus 900 according to the seventh embodiment. FIG. 16 is a side view of the spring-powered drive apparatus 900 according to the seventh embodiment. FIG. 17 is a rear view of the spring-powered drive apparatus 900 according to the seventh embodiment. FIG. 18 is a front view of the spring-powered drive apparatus 900 according to the seventh embodiment in a state in which a front cover 902a is removed.

Although FIGS. 15 to 18 show the spring-powered drive apparatus 900 according to the seventh embodiment in a state in use in which an output shaft 903 is attached to it, the spring-powered drive apparatus 900 according to the seventh embodiment does not include the output shaft 903 as its constituent part. The type of the output shaft 903 and its assembly orientation in the spring-powered drive apparatus 900 are selected by the user according to its use, and the spring-powered drive apparatus 900 is adapted to allow easy replacement of the output shaft 103 without disassembling the apparatus. The fixation and removal of the output shaft can be carried out by attaching and detaching set collars 929a, 929b externally attached to the output shaft 903 on the front and rear sides of the spring-powered drive apparatus 900.

For example, referring to FIG. 16, there may be a case where the output shaft 903 may be inserted into a through bore 939 (described later) of the spring-powered drive apparatus 900 from the front side or the left side in FIG. 16 so as to project from the front side and a case where the output shaft 903 is inserted into the through bore 939 of the spring-powered drive apparatus 900 from the rear side or the right side in FIG. 16 so that the driving part 903a of the output shaft 903 projects from the rear side. Thus, the direction of rotation of the output shaft 903 in outputting the power can be set in opposite directions between these cases.

More specifically, referring to FIG. 18, when the spring-powered drive apparatus 900 is seen from the front side, the output shaft 903 turns anticlockwise when outputting power. On the other hand, in the case where the output shaft 903 is inserted into the through bore 939 from the rear side so that the driving part 903a projects from the rear side as describe above, the output shaft 903 turns clockwise when outputting power when the spring-powered drive apparatus 900 is seen from the rear side.

Figure 19:
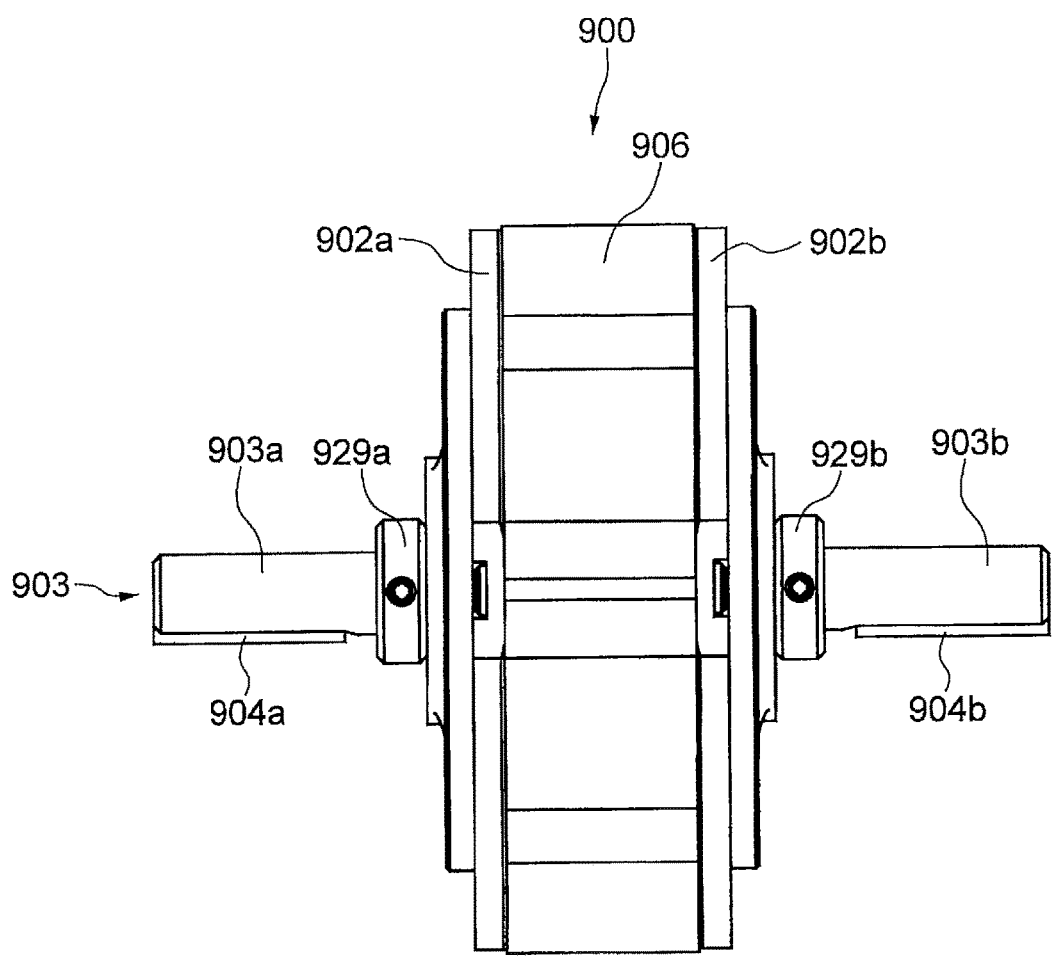
FIG. 19 is a side view of the spring-powered drive apparatus according to the seventh embodiment of the present invention in another mode of use.

FIG. 19 is a side view of the spring-powered drive apparatus 900 according to the seventh embodiment of the present invention in another mode of use. The output shaft 903 may be replaced by one having a long axial length to which keys 904a, 904b can be attached on its both sides. Thus, as shown in FIG. 19, it is possible to provide a configuration in which the driving parts 903a, 903b of the output shaft 903 project from both the front and rear sides of the spring-powered drive apparatus 900 to enable power output on both sides. A structure for facilitating the replacement of the output shaft 903 will be described later with reference to FIG. 20.

Next, features of the spring-powered drive apparatus 900 according to the seventh embodiment that are different from the above-described first embodiment will be described. As shown in FIGS. 15 and 17, the spring-powered drive apparatus 900 according to the seventh embodiment has a front cover 902a and a rear cover 902b, which constitute parts of the casing 902, and the front cover 902a and the rear cover 902b have openings 926a-926d, 927a-927d, so that the spiral spring 905 housed in the casing 902 can be seen from the outside without removing the covers 902a, 902b. Thus, the state of the spiral spring 905 can be checked easily, and efforts of maintenance during use can be reduced.

As shown in FIGS. 15 to 18, the spring-powered drive apparatus 900 differs from the above-described apparatus according to the first embodiment in that a circumferential wall 906, which constitutes a part of the casing 902, has on its outer side T-slots 925a-925h that extend substantially parallel to the axis of the output shaft 903 and pass through the circumferential wall 906. When seen from the front or rear side, the circumferential wall 906 has a substantially rectangular outer shape, and two T-slots 925a-925h are provided at each of the four corners. In other words, one T-slot 925a-925h is provided near each of the two ends of each side of the circumferential wall 906 having a substantially rectangular outer shape. This allows the user to mount the spring-powered drive apparatus 900 to a machine or the like in relatively versatile manners using T-slot nuts and bolts. For example, the user can select the number, type, and position of mounting parts such as T-slot nuts and bolts. The above-described shape of the circumferential wall 906 enables mass production of the circumferential wall 906 by extrusion.

Figure 20:
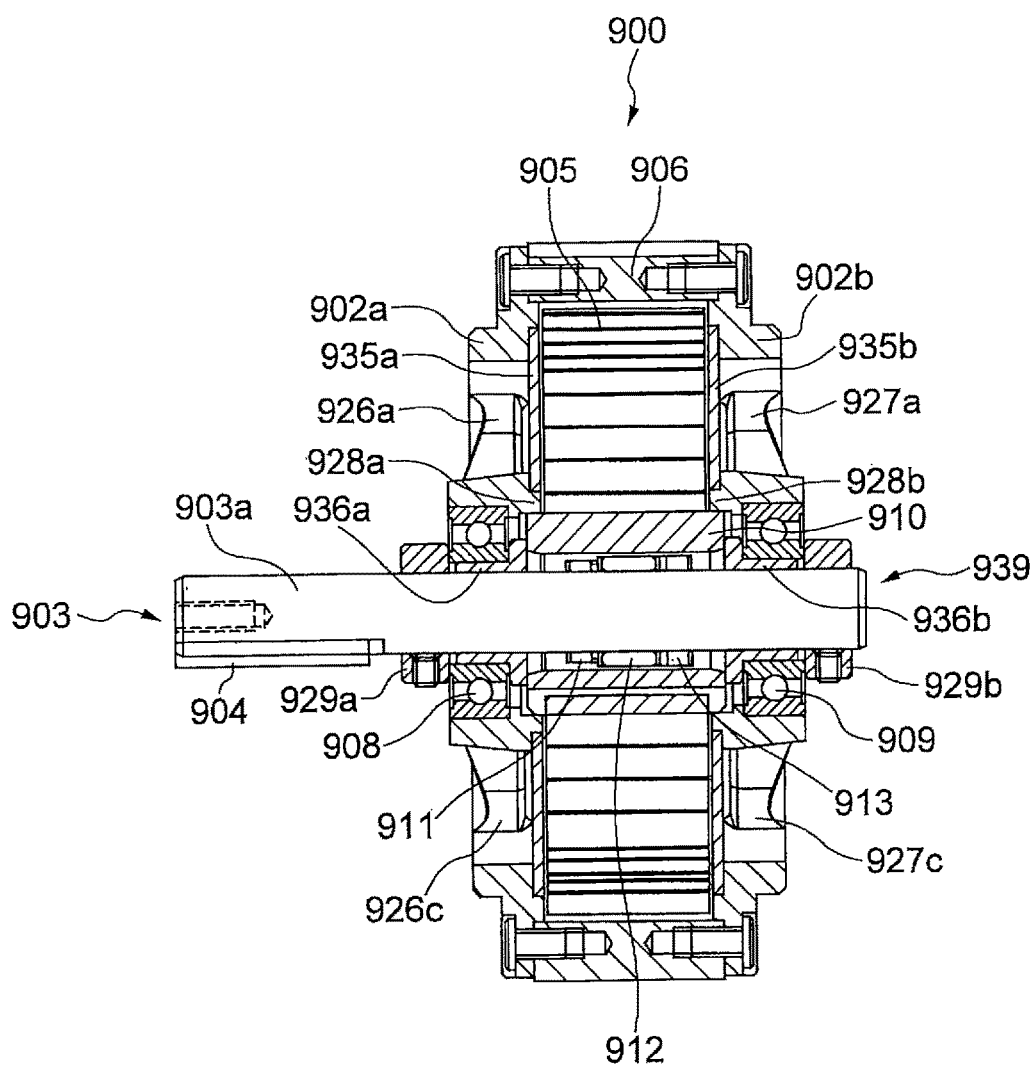
FIG. 20 is a cross sectional view of the spring-powered drive apparatus according to the seventh embodiment of the present invention taken on line XX-XX in FIG. 15.

FIG. 20 is a cross sectional view of the spring-powered drive apparatus 900 according to the seventh embodiment taken on line XX-XX in FIG. 15.

A first roller bearing 908 and a second roller bearing 909 are fitted in the covers 902a and the cover 902b respectively at their center. A sleeve 936a is fitted inside the first roller bearing 908, and a sleeve 936b is fitted inside the second roller bearing 909. The sleeves 936a, 936b, a first needle bearing 911, a one way clutch 912, and a second needle bearing 913 define the through bore 939 that extends through the spring-powered drive apparatus 900 from its front side to the rear side. The output shaft 903 is partly received in the through bore 939.

A bush 910 is externally fitted on the first needle bearing 911, the one way clutch 912, and the second needle bearing 913. The center side end of the spiral spring 905 is fixed to the bush 910. The mutually opposed sides of the sleeves 936a, 936b are each provided with a flange that extends radially outward between the first and second roller bearings 908, 909 and the bush 910. The covers 902a, 902b each has an annular portion 928a, 928b that surrounds the end of the bush 910 on its radially outer side. The annular portions 928a, 928b function as the positioners of the bush 910. The annular portions 928a, 928b restrict the movement of the bush 910 in the radial direction. It is sufficient for the annular portions 928a, 928b to restrict the movement of the bush 910 in the radial direction, and they may be constructed as positioners having a shape other than the annular shape. For example, the annular portions 928a, 928b may be replaced by C-shaped positioners. The positioners or the annular portions 928a, 928b may be provided as parts separate from the covers 902a, 902b.

The above-described structure can maintain the through bore 939 that passes through the spring-powered drive apparatus 900 from the front side to the rear side even when the output shaft 903 is absent. If the covers 902a, 902b are not provided with the annular portions 928a, 928b, when the output shaft 903 is removed from the spring-powered drive apparatus 900, the bush 910 is supported only by the spiral spring 905. Then, the bush 910 will be displaced by elastic deformation of the spiral spring 905, making it difficult to insert the output shaft 903. The above-described structure can keep the position of the bush 910 even if the output shaft 903 is removed from the spring-powered drive apparatus 900, making it easy to insert the output shaft 903 into the through bore 939.

Between the covers 902a, 902b and the spiral spring 905 are provided annular transparent plates 935a, 935b. The transparent plates 935a, 935b prevent the entrance of fingers and foreign matters into the spring-powered drive apparatus 900 while enabling observation of the interior of the spring-powered drive apparatus 900 through the openings 926a-926d, 927a-927d of the covers 902a, 902b. The transparent plates 935a, 935b may be made of plastic, glass or the like.

Eighth Embodiment

An eighth embodiment of the present invention will be described next. A spring-powered drive apparatus according to the eighth embodiment is the same as the above-described apparatus according to the seventh embodiment except for some parts. Therefore, parts equivalent to those in the spring-powered drive apparatus 900 according to the seventh embodiment will be denoted by reference numerals equal to the reference numerals used in the description of the seven embodiment plus 100 to eliminate the need for redundant descriptions. For example, the part equivalent to the output shaft 903 in the seventh embodiment will be denoted by numeral "1003".

Figure 21:
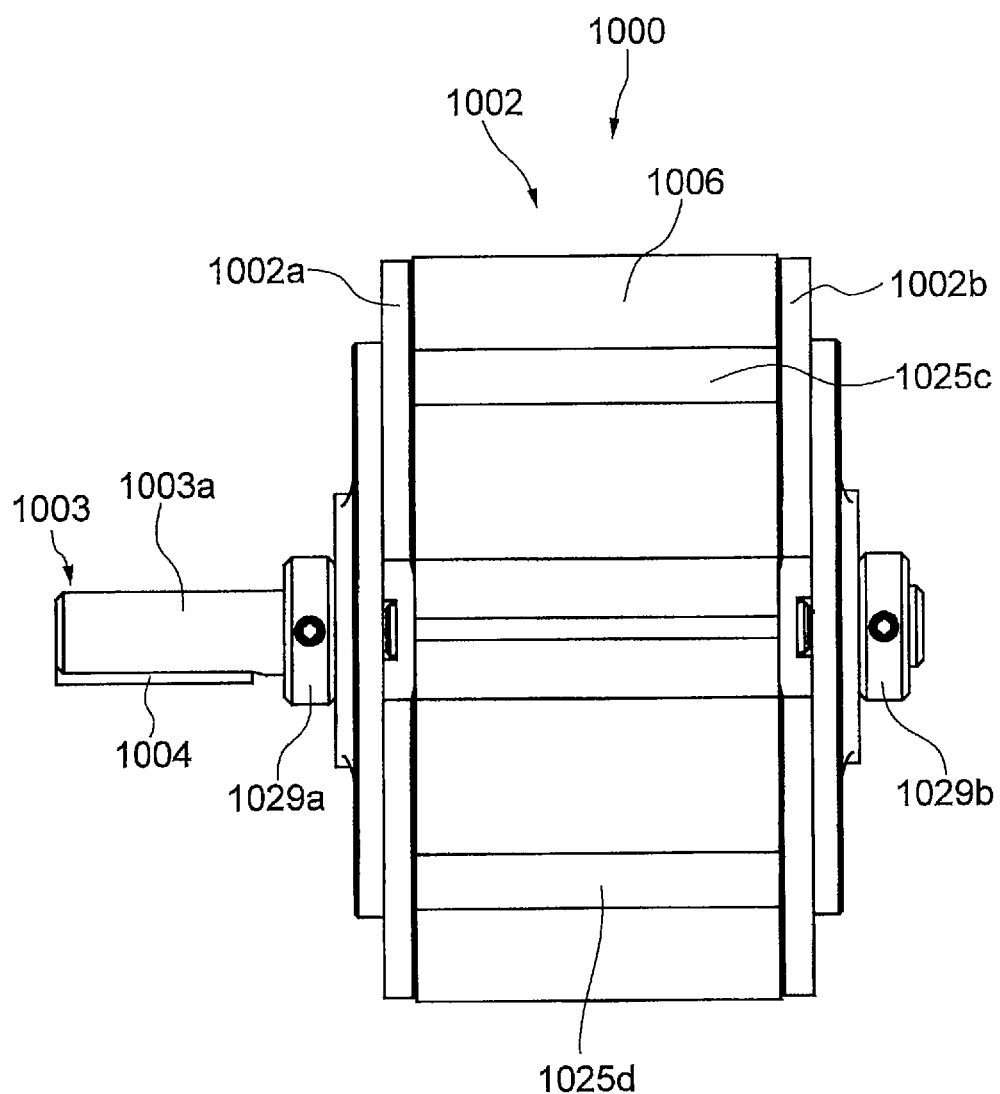
FIG. 21 is a side view of a spring-powered drive apparatus according to an eighth embodiment of the present invention.
Figure 22:
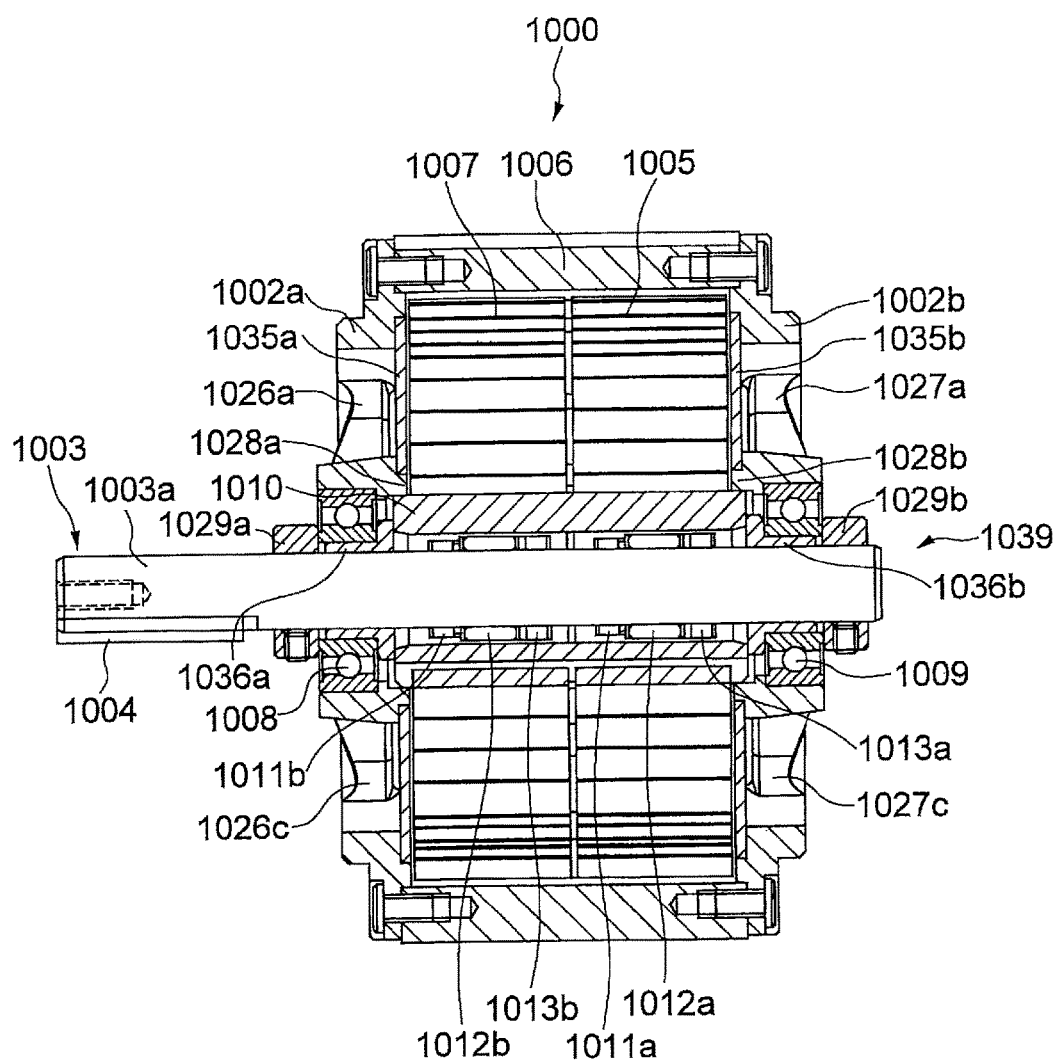
FIG. 22 is a cross sectional view of the spring-powered drive apparatus according to the eighth embodiment of the present invention.

FIG. 21 is a side view of the spring-powered drive apparatus 1000 according to the eighth embodiment. FIG. 22 is a cross sectional view of the spring-powered drive apparatus 1000 according to the eighth embodiment. FIG. 22 is a drawing similar to FIG. 20 for the seventh embodiment.

The apparatus according to the eighth embodiment is provided with two spiral springs 1005, 1007 to provide higher output torque than the apparatus according to the seventh embodiment. The radially inner ends of the spiral springs 1005, 1007 are fixed to a bush 1010. The bush 1010 are externally fitted on a first needle bearing 1011a, a first one way clutch 1012a, a second needle bearing 1013a, a third needle bearing 1011b, a second one way clutch 1012b, and a fourth needle bearing 1013b.

Figure 23:
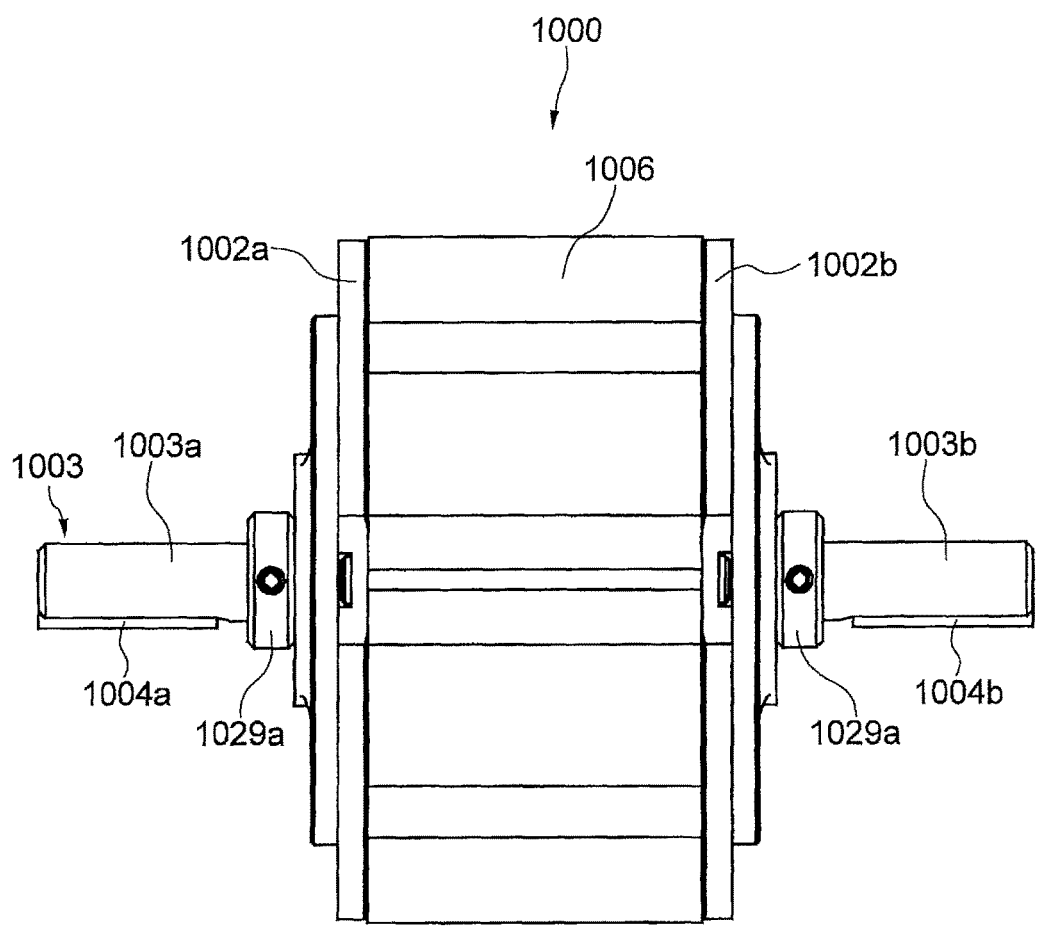
FIG. 23 is a side view of the spring-powered drive apparatus according to the eighth embodiment of the present invention in another mode of use.

FIG. 23 is a side view of the spring-powered drive apparatus 1000 according to the eighth embodiment of the present invention in another mode of use. The spring-powered drive apparatus 1000 according to the eighth embodiment also allows easy replacement of the output shaft 1003 as with the above-described apparatus according to the seventh embodiment. Therefore, the user can change it into a double-sided shaft configuration shown in FIG. 23. The direction of output can also be changed easily.

While specific embodiments have been described in detail to facilitate understanding of the present invention, the present invention is not limited to them, but various modifications and improvements may be made.

For example, the arrangement for facilitating the output shaft 903 in the above-described seventh and eighth embodiments may be applied to the first to sixth embodiments.

The structure of the casing 902 and the transparent plates 935a, 935b according to the seventh and eighth embodiments may be employed in the first to sixth embodiments.

As above, a compact spring-powered drive apparatus and a self-propelled caster can be provided.

REFERENCE SIGNS LIST 100, 200, 300, 400, 600, 900, 1000: spring-powered drive apparatus
500, 800: self-propelled caster
700: self-propelled wheel
102, 202, 302, 402, 502, 602, 702, 902, 1002: casing
902a, 902b, 1002a, 1002b: cover
103, 203, 315, 415, 903, 1003: output shaft
503, 703: center axle
103a, 203a, 203b, 903a, 1003a: driving part
303, 403: rotary shaft
104, 504, 904, 904a, 904b, 1004, 1004a, 1004b: key
105, 305, 905, 1005: first spiral spring
105a, 107a: projection
106, 306, 506, 706, 906, 1006: circumferential wall
106a: recess
107, 307, 907, 1007: second spiral spring
507, 707: spiral spring
108, 308, 508, 708, 908, 1008: first roller bearing
109, 309, 509, 709, 909, 1009: second roller bearing
110, 310, 510, 710, 901, 1010: bush
111, 311, 511, 911, 1011a: first needle bearing
112, 312, 512, 912, 1012a: one way clutch
113, 313, 513, 913, 1013a: second needle bearing
1011b: third needle bearing
1012b: second one way clutch
1013b: fourth needle bearing
314, 414: gear case
316, 416: support part
316a: bore portion
317: flange member
317a: cylindrical portion
317b: reduced diameter portion
317c: flange
317d: through hole
319: first spur gear
320: second spur gear
321: third roller bearing
322: fourth roller bearing
925a-925h, 1025c, 1025d: T-slot
926a-926d, 927a-927d, 1026a, 1026c, 1027a, 1027c: opening
928a, 928b, 1028a, 1028b: annular portion
929a, 929b, 1029a, 1029b: set collar
530: mount base
530a: through hole
530b: screw
531a, 531b: fork
532a, 532b: ring member
533: tire
534: spacer 534*a*: flange
935*a*, 935*b*, 1035*a*, 1035*b*: transparent plate
936*a*, 936*b*, 1036*a*, 1036*b*: sleeve
939, 1039: through bore
640: link shaft

The invention claimed is:

1. A spring-powered drive apparatus characterized by comprising:
   a casing:
   an output shaft partly housed in said casing, mounted on said casing in a relatively rotatable manner, and having a driving portion extending outside said casing;
   a one way clutch externally fitted on said output shaft in said casing; and
   a spiral spring housed in said casing, having a radially inner end fixed to an outer ring of said one way clutch, and wound by turning of said output shaft in the direction in which said one way clutch transmits torque.

2. The spring-powered drive apparatus according to claim 1, characterized in that:
   said casing has a circumferential wall provided with a plurality of recesses on its radially inner portion opposed to the outer circumferential surface of said spiral spring;
   said spiral spring has a radially outer end provided with a projection that projects radially outward to be received in one of said plurality of recesses; and
   when said spiral spring is wound, said projection is received in said recess until said spiral spring is wound to a specific degree of winding, and when said output shaft is turned beyond said specific degree of winding, said projection is dislocated from said recess.

3. The spring-powered drive apparatus according to claim 2, characterized in that said projection forms a contact surface to be in contact with said recess, said contact surface extending in a substantially radial direction of said spiral spring.

4. The spring-powered drive apparatus according to claim 2, characterized in that said recess is sized in such a way that said projection is dislocated from said recess after said spiral spring is wound to the maximum number of turns of said spiral spring.

5. The spring-powered drive apparatus according to claim 2, characterized in that said projection is shaped in such a way that said projection is dislocated from said recess after said spiral spring is wound to the maximum number of turns of said spiral spring.

6. The spring-powered drive apparatus according to claim 1, characterized in that said casing has a T-slot provided on its outer portion.

7. The spring-powered drive apparatus according to claim 1, characterized in that said casing has an opening that enables the interior of said casing to be observed.

8. A spring-powered drive apparatus characterized by comprising:
   a one way clutch into which an output shaft is inserted;
   a cylindrical bush externally fitted on said one way clutch;
   a spiral spring having a radially inner end fixed to said bush and wound by turning of said output shaft in a direction in which said one way clutch transmits torque; and
   a casing housing said one way clutch, said bush, and said spiral spring and having a positioner that surrounds an axial end of said bush from radially outside.

9. The spring-powered drive apparatus according to claim 8, characterized in that:
   said casing has a circumferential wall provided with a plurality of recesses on its radially inner portion opposed to the outer circumferential surface of said spiral spring;
   said spiral spring has a radially outer end provided with a projection that projects radially outward to be received in one of said plurality of recesses; and
   when said spiral spring is wound, said projection is received in said recess until said spiral spring is wound to a specific degree of winding, and when said output shaft is turned beyond said specific degree of winding, said projection is dislocated from said recess.

10. The spring-powered drive apparatus according to claim 9, characterized in that said projection forms a contact surface to be in contact with said recess, said contact surface extending in a substantially radial direction of said spiral spring.

11. The spring-powered drive apparatus according to claim 9, characterized in that said recess is sized in such a way that said projection is dislocated from said recess after said spiral spring is wound to the maximum number of turns of said spiral spring.

12. The spring-powered drive apparatus according to claim 9, characterized in that said projection is shaped in such a way that said projection is dislocated from said recess after said spiral spring is wound to the maximum number of turns of said spiral spring.

13. The spring-powered drive apparatus according to claim 8, characterized in that said casing has a T-slot provided on its outer portion.

14. The spring-powered drive apparatus according to claim 8, characterized in that said casing has an opening that enables the interior of said casing to be observed.

15. The spring-powered drive apparatus characterized by comprising:
   a casing;
   a rotary shaft partly housed in said casing and mounted on said casing in a relatively rotatable manner, a one way clutch externally fitted on said rotary shaft in said casing;
   a spiral spring housed in said casing, having a radially inner end fixed to an outer ring of said one way clutch, and wound by turning of said rotary shaft in a direction in which said one way clutch transmits torque;
   a support part fixed to said casing;
   an output shaft for driving a driven member, mounted on said support part in an orientation substantially parallel to said rotary shaft in a relatively rotatable manner; and
   a torque transmission mechanism that transmits torque of said rotary shaft to said output shaft.

16. The spring-powered drive apparatus according to claim 15, characterized in that said output shaft is a hollow shaft.

17. The spring-powered drive apparatus according to claim 15, characterized by further comprising a flange member that rises from said support part, has a cylindrical shape coaxial with said output shaft, and is provided with a flange that extends radially outward.

18. The spring-powered drive apparatus according to claim 15, characterized in that:
   said casing has a circumferential wall provided with a plurality of recesses on its radially inner portion opposed to the outer circumferential surface of said spiral spring;
   said spiral spring has a radially outer end provided with a projection that projects radially outward to be received in one of said plurality of recesses; and when said spiral spring is wound, said projection is received in said recess until said spiral spring is wound to a specific degree of winding, and when said rotary shaft is turned beyond said specific degree of winding, said projection is dislocated from said recess.

19. The spring-powered drive apparatus according to claim 18, characterized in that said projection forms a contact surface to be in contact with said recess, said contact surface extending in a substantially radial direction of said spiral spring.

20. The spring-powered drive apparatus according to claim 18, characterized in that said recess is sized in such a way that said projection is dislocated from said recess after said spiral spring is wound to the maximum number of turns of said spiral spring.

21. The spring-powered drive apparatus according to claim 18, characterized in that said projection is shaped in such a way that said projection is dislocated from said recess after said spiral spring is wound to the maximum number of turns of said spiral spring.

22. The spring-powered drive apparatus according to claim 15, characterized in that said casing has a T-slot provided on its outer portion.

23. The spring-powered drive apparatus according to claim 15, characterized in that said casing has an opening that enables the interior of said casing to be observed.

24. A self-propelled caster characterized by comprising:
   a casing having a cylindrical outer circumferential surface;
   a tire fixedly attached to the radially outer portion of said casing;
   a center axle partly housed in said casing, mounted on said casing in a relatively rotatable manner, and partly extending outside said casing;
   a one way clutch externally fitted on said center axle in said casing;
   a spiral spring housed in said casing, having a radially inner end fixed to an outer ring of said one way clutch, and wound when turning relative to said center axle in the direction in which said one way clutch transmits torque.

25. The self-propelled caster according to claim 24, characterized in that:
   said casing has a circumferential wall provided with a plurality of recesses on its radially inner portion opposed to the outer circumferential surface of said spiral spring;
   said spiral spring has a radially outer end provided with a projection that projects radially outward to be received in said recess; and
   when said spiral spring is wound, said projection is received in said recess until said spiral spring is wound to a specific degree of winding, and when said casing is turned beyond said specific degree of winding, said projection is dislocated from said recess.

26. The self-propelled caster according to claim 25, characterized in that said projection forms a contact surface to be in contact with said recess, said contact surface extending in a substantially radial direction of said spiral spring.

27. The self-propelled caster according to claim 25, characterized in that said recess is sized in such a way that said projection is dislocated from said recess after said spiral spring is wound to the maximum number of turns of said spiral spring.

28. The self-propelled caster according to claim 25, characterized in that said projection is shaped in such a way that said projection is dislocated from said recess after said spiral spring is wound to the maximum number of turns of said spiral spring.

29. The self-propelled caster according to claim 24, characterized by further comprising:
   a mount base to be attached to a target object; and
   a fork extending from said mount base toward said center axle to fixedly connect said mount base and said center axle.

30. The self-propelled caster according to claim 24, characterized by further comprising:
   a shock absorber including a second casing, a rotary shaft partly housed in said second casing, mounted on said second casing in a relatively rotatable manner, and having a driving portion extending outside said second casing, and a second spiral spring housed in said second casing and biasing said rotary shaft; and
   a link shaft having one end to which said center axle is fixed in a direction substantially perpendicular to the longitudinal direction of said link shaft and the other end to which said rotary shaft is fixed in a direction substantially perpendicular to the longitudinal direction of said link shaft.

31. The self-propelled caster according to claim 30, characterized in that said second casing has a T-slot provided on its outer portion.

32. The self-propelled caster according to claim 24, characterized in that said casing has an opening that enables the interior of said casing to be observed.

33. The self-propelled caster according to claim 30, characterized in that said second casing has an opening that enables the interior of said second casing to be observed.

* * * * *